United States Patent
Isurugi et al.

(10) Patent No.: US 9,193,096 B2
(45) Date of Patent: Nov. 24, 2015

(54) DIE, DIE PRODUCTION METHOD, AND PRODUCTION OF ANTIREFLECTION FILM

(75) Inventors: Akinobu Isurugi, Osaka (JP); Kiyoshi Minoura, Osaka (JP); Hidekazu Hayashi, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 316 days.

(21) Appl. No.: 13/580,524

(22) PCT Filed: Feb. 8, 2011

(86) PCT No.: PCT/JP2011/052599
§ 371 (c)(1),
(2), (4) Date: Sep. 12, 2012

(87) PCT Pub. No.: WO2011/105206
PCT Pub. Date: Sep. 1, 2011

(65) Prior Publication Data
US 2013/0004612 A1 Jan. 3, 2013

(30) Foreign Application Priority Data
Feb. 24, 2010 (JP) ................. 2010-038991

(51) Int. Cl.
*B29C 33/42* (2006.01)
*B29C 33/38* (2006.01)
(Continued)

(52) U.S. Cl.
CPC ............... *B29C 33/38* (2013.01); *C25D 11/12* (2013.01); *C25D 11/16* (2013.01); *C25D 11/24* (2013.01); *G02B 1/118* (2013.01); *B29L 2007/00* (2013.01); *B29L 2023/00* (2013.01)

(58) Field of Classification Search
USPC ......... 264/1.34, 2.5, 494, 496, 1.36; 425/385, 425/418, 471
See application file for complete search history.

(56) References Cited

U.S. PATENT DOCUMENTS 6,359,735 B1  3/2002  Gombert et al.
7,713,768 B2 * 5/2010  Masuda et al. ............... 438/29
(Continued)

FOREIGN PATENT DOCUMENTS

JP  2001517319 A  10/2001
JP  2003531962 A  10/2003
(Continued)

OTHER PUBLICATIONS

International Preliminary Report on Patentability dated Sep. 27, 2012.
(Continued)

*Primary Examiner* — Joseph S Del Sole
*Assistant Examiner* — Thukhanh T Nguyen
(74) *Attorney, Agent, or Firm* — Harness, Dickey & Pierce, P.L.C.

(57) ABSTRACT

One of the objects of the present invention is to provide a method for readily manufacturing a seamless mold in the form of a roll which has a porous alumina layer over its surface. The mold manufacturing method of the present invention is a method for manufacturing a mold which has a porous alumina layer over its surface, including the steps of: providing a hollow cylindrical support; forming an insulating layer on an outer perimeter surface of the hollow cylindrical support; depositing aluminum on the insulating layer to form an aluminum film; and anodizing a surface of the aluminum film to form a porous alumina layer which has a plurality of minute recessed portions.

18 Claims, 10 Drawing Sheets

(51) Int. Cl.
*C25D 11/16* (2006.01)
*G02B 1/118* (2015.01)
*C25D 11/12* (2006.01)
*C25D 11/24* (2006.01)
*B29L 7/00* (2006.01)
*B29L 23/00* (2006.01)

(56) References Cited

U.S. PATENT DOCUMENTS

| | | |
|---|---|---|
| 8,545,708 B2 * | 10/2013 | Fujii et al. .................... 264/1.34 |
| 2003/0205475 A1 | 11/2003 | Sawitowski |
| 2004/0053471 A1 | 3/2004 | Kikuchi et al. |
| 2007/0126136 A1 * | 6/2007 | Fujita et al. .................... 425/385 |
| 2007/0159698 A1 | 7/2007 | Taguchi et al. |
| 2009/0194914 A1 | 8/2009 | Uozu et al. |
| 2010/0258978 A1 | 10/2010 | Yamada et al. |
| 2011/0027408 A1 * | 2/2011 | Suzuki et al. .................. 425/471 |

FOREIGN PATENT DOCUMENTS

| | | |
|---|---|---|
| JP | 2004-031804 A | 1/2004 |
| JP | 2005156695 A | 6/2005 |
| JP | 2008-045054 A | 2/2008 |
| JP | 2009-166502 A | 7/2009 |
| WO | WO-2006059686 A1 | 6/2006 |
| WO | WO-2008001847 A1 | 1/2008 |
| WO | WO-2009107294 A1 | 9/2009 |

OTHER PUBLICATIONS

International Search Report PCT/ISA/210, Apr. 7, 2011.

* cited by examiner (a)

(b)

(c)

(d)

(a)

(b)

(a)

(b)

(c)

(d)

(e)

(a)

(b)

(c)

(a)

(b)

(c)

DIE, DIE PRODUCTION METHOD, AND PRODUCTION OF ANTIREFLECTION FILM

TECHNICAL FIELD

The present invention relates to a mold, a mold manufacturing method, and an antireflection film production method. In this specification, the "mold" includes molds that are for use in various processing methods (stamping and casting), and is sometimes referred to as a stamper. The mold can also be used for printing (including nanoimprinting).

BACKGROUND ART

Display devices for use in TVs, cell phones, etc., and optical elements, such as camera lenses, etc., usually adopt an antireflection technique in order to reduce the surface reflection and increase the amount of light transmitted therethrough. This is because, when light is transmitted through the interface between media of different refractive indices, e.g., when light is incident on the interface between air and glass, the amount of transmitted light decreases due to, for example, Fresnel reflection, thus deteriorating the visibility.

An antireflection technique which has been receiving attention in recent years is forming over a substrate surface a very small uneven pattern in which the interval of recessed portions or raised portions is not more than the wavelength of visible light ($\lambda$=380 nm to 780 nm). See Patent Documents 1 to 4. The two-dimensional size of a raised portion of an uneven pattern which performs an antireflection function is not less than 10 nm and less than 500 nm.

This method utilizes the principles of a so-called moth-eye structure. The refractive index for light that is incident on the substrate is continuously changed along the depth direction of the recessed portions or raised portions, from the refractive index of a medium on which the light is incident to the refractive index of the substrate, whereby reflection of a wavelength band that is subject to antireflection is prevented.

The moth-eye structure is advantageous in that it is capable of performing an antireflection function with small incident angle dependence over a wide wavelength band, as well as that it is applicable to a number of materials, and that an uneven pattern can be directly formed in a substrate. As such, a high-performance antireflection film (or antireflection surface) can be provided at a low cost.

As the method of forming a moth-eye structure, using an anodized porous alumina layer which is obtained by means of anodization of aluminum has been receiving attention (Patent Documents 2 to 4).

Now, the anodized porous alumina layer which is obtained by means of anodization of aluminum is briefly described. Conventionally, a method of forming a porous structure by means of anodization has been receiving attention as a simple method for making nanometer-scale micropores (very small recessed portions) in the shape of a circular column in a regular arrangement. A base is immersed in an acidic electrolytic solution of sulfuric acid, oxalic acid, phosphoric acid, or the like, or an alkaline electrolytic solution, and this is used as an anode in application of a voltage, which causes oxidation and dissolution. The oxidation and the dissolution concurrently advance over a surface of the base to form an oxide film which has micropores over its surface. The micropores, which are in the shape of a circular column, are oriented vertical to the oxide film and exhibit a self-organized regularity under certain conditions (voltage, electrolyte type, temperature, etc.). Thus, this anodized porous alumina layer is expected to be applied to a wide variety of functional materials.

A porous alumina layer formed under specific conditions includes cells in the shape of a generally regular hexagon which are in a closest packed two-dimensional arrangement when seen in a direction perpendicular to the film surface. Each of the cells has a micropore at its center. The arrangement of the micropores is periodic. The cells are formed as a result of local dissolution and growth of a coating. The dissolution and growth of the coating concurrently advance at the bottom of the micropores which is referred to as a barrier layer. As known, the size of the cells, i.e., the interval between adjacent micropores (the distance between the centers), is approximately twice the thickness of the barrier layer, and is approximately proportional to the voltage that is applied during the anodization. It is also known that the diameter of the micropores depends on the type, concentration, temperature, etc., of the electrolytic solution but is, usually, about ⅓ of the size of the cells (the length of the longest diagonal of the cell when seen in a direction vertical to the film surface). Such micropores of the porous alumina may constitute an arrangement which has a high regularity (periodicity) under specific conditions, an arrangement with a regularity degraded to some extent depending on the conditions, or an irregular (non-periodic) arrangement.

Patent Document 2 discloses a method of producing an antireflection film (antireflection surface) with the use of a stamper which has an anodized porous alumina film over its surface.

Patent Document 3 discloses the technique of forming tapered recesses with continuously changing pore diameters by repeating anodization of aluminum and a pore diameter increasing process.

The applicant of the present application discloses, in Patent Document 4, the technique of forming an antireflection film with the use of an alumina layer in which very small recessed portions have stepped lateral surfaces.

As described in Patent Documents 1, 2, and 4, by providing an uneven structure (macro structure) which is greater than a moth-eye structure (micro structure) in addition to the moth-eye structure, the antireflection film (antireflection surface) can be provided with an antiglare function. The two-dimensional size of a raised portion of the uneven structure which is capable of performing the antiglare function is not less than 1 µm and less than 100 µm. The entire disclosures of Patent Documents 1, 2, and 4 are herein incorporated by reference.

Utilizing an anodized porous aluminum film can facilitate the manufacture of a mold which is used for formation of a moth-eye structure over a surface (hereinafter, "moth-eye mold"). In particular, as described in Patent Documents 2 and 4, when the surface of the anodized aluminum film as formed is used as a mold without any modification, a large effect of reducing the manufacturing cost is achieved. The structure of the surface of a moth-eye mold which is capable of forming a moth-eye structure is herein referred to as "inverted moth-eye structure".

A known antireflection film production method with the use of a moth-eye mold uses a photocurable resin. Firstly, a photocurable resin is applied over a substrate. Then, an uneven surface of a moth-eye mold which has undergone a mold release treatment is pressed against the photocurable resin in vacuum, whereby the uneven structure at the surface of the moth-eye mold is filled with the photocurable resin. Then, the photocurable resin in the uneven structure is irradiated with ultraviolet light so that the photocurable resin is cured. Thereafter, the moth-eye mold is separated from the substrate, whereby a cured layer of the photocurable resin to which the uneven structure of the moth-eye mold has been transferred is formed over the surface of the substrate. The method of producing an antireflection film with the use of the photocurable resin is disclosed in, for example, Patent Document 4.

CITATION LIST

Patent Literature

Patent Document 1: Japanese PCT National Phase Laid-Open Publication No. 2001-517319
Patent Document 2: Japanese PCT National Phase Laid-Open Publication No. 2003-531962
Patent Document 3: Japanese Laid-Open Patent Publication No. 2005-156695
Patent Document 4: WO 2006/059686

SUMMARY OF INVENTION

Technical Problem

To achieve efficient mass production of an antireflection film, the production is preferably realized by employing a roll-to-roll method with the use of a moth-eye mold that is in the form of a roll, for example. The moth-eye mold that is in the form of a roll may be manufactured by, for example, performing anodization and etching with the use of a hollow cylindrical element of bulk aluminum as the base. However, in the case of a mold which is manufactured according to this method, if the porous alumina layer is worn out after the mold is repeatedly used for transfer, the entirety of the mold that is in the form of a roll will need to be replaced.

Another manufacturing method of the moth-eye mold that is in the form of a roll may be realized by forming an aluminum layer on a flexible polymer film, anodizing a surface of the aluminum layer to form a porous alumina layer, and thereafter, fixing the polymer film onto the outer perimeter surface of a support that is in the form of a roll. The mold in the form of a roll which is manufactured according to this method only needs peeling off the polymer film when the porous alumina layer is worn out, leading to a low cost.

However, since the polymer film is fixed in the form of a roll, the moth-eye mold in the form of a roll which is manufactured according to this method has a seam in its perimeter surface. Thus, the moth-eye mold in the form of a roll which is manufactured according to this method cannot form a moth-eye structure without making any seam.

The above problem is not limited to the moth-eye mold but is a common problem among molds in the form of a roll which have a porous alumina layer over their surfaces.

One of the major objects of the present invention is to provide a method for readily manufacturing a seamless mold in the form of a roll which has a porous alumina layer over its surface. Particularly, the present invention intends to provide a method for readily manufacturing a seamless moth-eye mold that is in the form of a roll.

Solution to Problem

A mold manufacturing method of the present invention is a method for manufacturing a mold which has a porous alumina layer over its surface, including the steps of: (a) providing a hollow cylindrical support; (b) forming an insulating layer on an outer perimeter surface of the hollow cylindrical support; (c) depositing aluminum on the insulating layer to form an aluminum film; and (d) anodizing a surface of the aluminum film to form a porous alumina layer which has a plurality of minute recessed portions.

In one embodiment, the insulating layer is an organic insulating layer.

In one embodiment, step (b) includes (e) applying a curable resin to the outer perimeter surface of the hollow cylindrical support to form a curable resin layer, and (f) curing the curable resin.

In one embodiment, step (e) includes forming the curable resin layer by means of electrodeposition.

In one embodiment, step (e) includes forming the curable resin layer by means of spray painting.

In one embodiment, the curable resin contains acrylic melamine.

In one embodiment, the curable resin contains urethane.

In one embodiment, the curable resin contains a polyamic acid.

In one embodiment, the hollow cylindrical support is a cylindrical metal pipe.

In one embodiment, the hollow cylindrical support is a metal sleeve.

In one embodiment, an inorganic underlayer is provided between the organic insulating layer and the porous alumina layer.

In one embodiment, the inorganic underlayer contains $SiO_2$.

In one embodiment, the inorganic underlayer has a thickness of not less than 50 nm and not more than 300 nm.

In one embodiment, a buffer layer is provided between the inorganic underlayer and the porous alumina layer, the buffer layer containing aluminum and either of oxygen or nitrogen, and the buffer layer having such a profile that a content of the aluminum is higher in a portion which is closer to the porous alumina layer than in another portion which is closer to the inorganic underlayer.

Another mold manufacturing method of the present invention is a method for manufacturing a mold which has a porous alumina layer over its surface, including the steps of: (a) providing a support that is in the form of a roll and a tubular resin film; (b) adhering the tubular resin film to an outer perimeter surface of the support that is in the form of a roll; (c) depositing aluminum on the tubular resin film to form an aluminum film; and (d) anodizing a surface of the aluminum film to form a porous alumina layer which has a plurality of minute recessed portions.

In one embodiment, the tubular resin film is a polyimide film.

In one embodiment, in steps (a) and (b) the polyimide film has an imidization rate of not more than 99%.

In one embodiment, the support that is in the form of a roll is a flexible metal sleeve, and step (b) includes bending the metal sleeve, inserting the metal sleeve into the tubular resin film in such a manner that the metal sleeve is maintained in a bent state during the insertion, and causing the metal sleeve to recover from the bent state such that the tubular resin film adheres to an outer perimeter surface of the metal sleeve.

In one embodiment, the porous alumina layer has a plurality of minute recessed portions whose two-dimensional size viewed in a direction normal to its surface is not less than 50 nm and less than 500 nm, the method further includes the steps of (g) bringing the porous alumina layer into contact with an etching solution to enlarge the plurality of minute recessed portions of the porous alumina layer, and (h) after step (g), further anodizing the surface of the aluminum film to grow the plurality of minute recessed portions, and after step (h), step (g) and step (h) are further performed.

A mold of the present invention is a mold which is manufactured according to any of the above-described manufacturing methods, the mold including a porous alumina layer which has an inverted moth-eye structure over its surface, the porous alumina layer having a plurality of minute recessed portions whose two-dimensional size viewed in a direction normal to its surface is not less than 50 nm and less than 500 nm.

An antireflection film production method of the present invention includes the steps of: providing the above-described mold and a work; and irradiating a UV-curable resin provided between the mold and a surface of the work with ultraviolet light, thereby curing the UV-curable resin.

Another antireflection film production method of the present invention includes the steps of: providing the above-described mold, a core member that is in the form of a roll, and a work; inserting the core member that is in the form of a roll inside the metal sleeve; and irradiating a UV-curable resin provided between the mold and a surface of the work with ultraviolet light, thereby curing the UV-curable resin.

Advantageous Effects of Invention

According to the present invention, a method for readily manufacturing a seamless mold in the form of a roll which has a porous alumina layer over its surface is provided.

DESCRIPTION OF EMBODIMENTS

Figure 1:
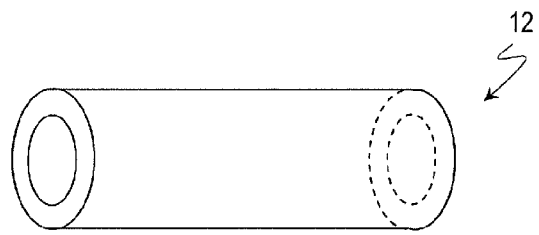
[FIG. 1] (a) to (d) are diagrams for illustrating a mold manufacturing method of an embodiment of the present invention.
Figure 1:
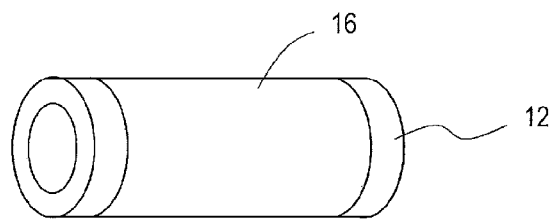
Figure 1:
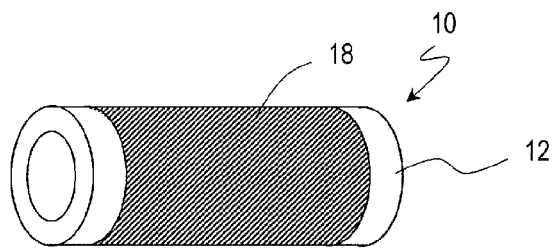
Figure 1:
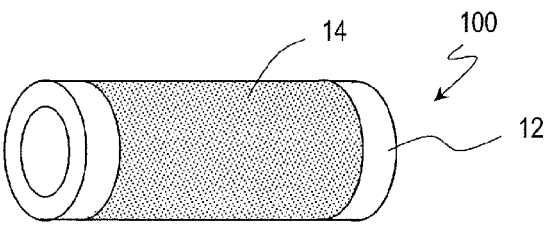

Hereinafter, a mold and a mold manufacturing method of an embodiment of the present invention are described with reference to the drawings. However, the present invention is not limited to the embodiment which will be exemplified below. Note that the mold manufacturing method of the present invention may be, for example, a method for manufacturing a mold in the form of a roll, which is preferably used for production of an antireflection film that has a moth-eye structure.

Hereinafter, a mold manufacturing method of an embodiment of the present invention is described with reference to FIGS. 1(a) to 1(d). FIGS. 1(a) to 1(d) are schematic cross-sectional views for illustrating the mold manufacturing method of the embodiment of the present invention.

Firstly, as shown in FIG. 1(a), a hollow cylindrical support 12 is provided. A cylindrical metal pipe may be used as the support 12. Alternatively, a metal sleeve may be used as the support 12. Note that the following description is given with an example where a cylindrical metal pipe is used as the support 12.

In this specification, the cylindrical metal pipe refers to a hollow cylindrical element which is made of a metal and which has a thickness of not less than 1.0 mm. As the cylindrical metal pipe, for example, a pipe which is made of aluminum or a pipe of stainless steel (e.g., JIS standards SUS304) may be used. The metal sleeve refers to a hollow cylindrical element which is made of a metal and which has a thickness of not less than 0.02 mm and not more than 1.0 mm. The metal sleeve may be a metal sleeve which is made of any of nickel, stainless steel, and titanium, or made of an alloy containing at least one of these materials.

When a mold in the form of a roll is used for transferring an uneven structure according to a roll-to-roll method, the mold needs to have some rigidity. The metal pipe has relatively high rigidity and is therefore advantageous in that a mold which is manufactured using the metal pipe as the support 12 has relatively high rigidity, and the manufactured mold itself can be used in the roll-to-roll method. On the other hand, a mold which is manufactured using a flexible metal sleeve as the support 12 has relatively low rigidity. Therefore, for example, as will be described later, a core member may be provided inside the metal sleeve when the mold is used in the roll-to-roll method. Note that, in the present invention, the statement that the metal sleeve has flexibility means that the metal sleeve is soft to such an extent that the metal sleeve can be readily bent by exertion of a force on part of the outer perimeter surface of the metal sleeve. From the viewpoint of rigidity, the thickness of the metal pipe is preferably not less than 6 mm, and is more preferably not less than 10 mm.

Then, as shown in FIG. 1(b), an insulating layer 16 is formed on the outer perimeter surface of the support 12. The insulating layer 16 may be, for example, an organic insulating layer. As the material of the organic insulating layer, for example, a resin may be used. For example, a curable resin is applied over the outer perimeter surface of the support 12 to form a curable resin layer, and thereafter, the curable resin is cured, whereby the organic insulating layer is formed on the outer perimeter surface of the support 12.

The curable resin layer may be formed by means of electrodeposition, for example. The electrodeposition may be, for example, a known electrodeposition painting method. For example, firstly, the support 12 is washed. Then, the support 12 is immersed in an electrodeposition bath in which an electrodeposition solution that contains an electrodeposition resin is stored. In the electrodeposition bath, an electrode is installed. When the curable resin layer is formed by means of cationic electrodeposition, an electric current is allowed to flow between the support 12 and the anode, where the support 12 serves as the cathode and the electrode installed in the electrodeposition bath serves as the anode, so that the electrodeposition resin is deposited on the outer perimeter surface of the support 12, whereby the curable resin layer is formed. When the curable resin layer is formed by means of anionic electrodeposition, an electric current is allowed to flow, where the support 12 serves as the anode and the electrode installed in the electrodeposition bath serves as the cathode, whereby the curable resin layer is formed. Thereafter, the washing step and the baking step are performed, whereby an organic insulating layer is formed. The electrodeposition resin used may be, for example, a polyimide resin, an epoxy resin, an acrylic resin, a melamine resin, a urethane resin, or a mixture thereof.

A method for forming the curable resin layer other than the electrodeposition is, for example, spray painting. The curable resin layer is formed on the outer perimeter surface of the support 12 using, for example, a urethane resin or a polyamic acid according to a spray coating method or an electrostatic painting method. The urethane resin may be, for example, an UreTop product manufactured by Nippon Paint Co., Ltd.

The other examples than those described above include a dip coating method and a roll coating method. For example, when the curable resin is a thermosetting polyamic acid, the organic insulating layer may be formed by applying the polyamic acid according to a dip coating method to form a curable resin layer and then heating the polyamic acid to about 300° C. The polyamic acid is available from, for example, Hitachi Chemical Company, Ltd.

Providing the insulating layer 16 on the outer perimeter surface of the support 12 realizes insulation between the support 12 and an aluminum film formed on the insulating layer 16 (an aluminum film 18 shown in FIG. 1(c)).

In a moth-eye mold manufacturing process that will be described later in which the anodization step and the etching step were repeated under the condition that the insulation between the support 12 and the aluminum film 18 was insufficient, when the etching was performed, a local cell reaction occurred between the support 12 and the aluminum film 18 so that recesses with a diameter of about 1 μm were formed in the aluminum film 18 in some cases. Using such a moth-eye mold that has relatively-large recesses leads to a failure to produce an antireflection film which has a desired moth-eye structure.

Also, if the insulation between the support 12 and the aluminum film 18 is insufficient, an electric current would sometimes flow through the support 12 in the anodization step which will be described later. The electric current flowing through the support 12 means that there is an excessive current flow in the entire base that includes the support 12 and the aluminum film 18. Therefore, this is not desired from the viewpoint of safety.

As will be described later with Inventive Examples, a mold which is manufactured by forming the insulating layer (e.g., a layer formed by curing the electrodeposition resin, a layer formed by curing a urethane resin, or a layer formed by curing a polyamic acid) and then performing deposition of aluminum and anodization has sufficient insulation between the aluminum film 18 and the support 12. Providing the insulating layer 16 enables to prevent occurrence of the above-described local cell reaction in the etching step and occurrence of the above-described excessive current flow in the anodization step.

As will be described later with Inventive Examples, the present inventor compared a layer which was formed by curing the electrodeposition resin, a layer which was formed by curing a urethane resin that was applied by means of spray painting, and a layer which was formed by curing a polyamic acid that was applied according to a dip coating method. The adhesion of the aluminum film 18 that was formed later increased in order of "cured electrodeposition resin layer">"cured urethane resin layer">"cured polyamic acid layer".

The insulating layer 16 may be an inorganic insulating layer. The material of the inorganic insulating layer may be, for example, $SiO_2$ or $Ta_2O_5$. The inorganic insulating layer has relatively poor step coverage. Thus, if the surface of the support has unevenness, electric conduction would sometimes occur between the support and the aluminum film. For example, as will be described later with Comparative Examples, when there is a foreign substance (e.g., a remainder of abrasive particles used for processing the surface of the support) on the surface of the support, electric conduction would sometimes occur via the foreign substance between the support and the aluminum film. When the surface of the support has low specularity and hence has an uneven shape, electric conduction readily occurs. Note that when a $SiO_2$ layer and a $Ta_2O_5$ layer were provided as the inorganic insulating layer, the adhesion of the aluminum film 18 to the inorganic insulating layer was sufficient.

As will be described later with Inventive Examples and Comparative Examples, the organic insulating layer realizes a higher specularity in the surface of the aluminum film 18 that is formed on the insulating layer than the inorganic insulating layer. As will be described later with Comparative Examples, the present inventor formed an inorganic insulating layer on the outer perimeter surface of the support. An uneven shape corresponding to the uneven shape of the surface of the support was formed in the surface of the inorganic insulating layer. As a result, when an aluminum film was formed on the surface of the inorganic insulating layer, the specularity of the surface of the aluminum film decreased. On the other hand, as will be described later with Inventive Examples, the specularity of the surface of the aluminum film 18 formed on the organic insulating layer was high irrespective of the uneven shape of the surface of the support 12. Note that, even in the case where an inorganic insulating layer is provided, by making the specularity of the surface of the support 12 high, the specularity of the surface of the aluminum film 18 formed on the inorganic insulating layer can be high.

In Inventive Examples which will be described later, a layer which was formed by curing the electrodeposition resin, a layer which was formed by curing a urethane resin that was applied by means of spray painting, and a layer which was formed by curing a polyamic acid that was applied according to a dip coating method were compared in terms of the specularity of the surface of the aluminum film 18 formed on the insulating layer 16. The specularity of the surface of the aluminum film 18 increased in order of "cured urethane resin layer">"cured electrodeposition resin layer">"cured polyamic acid layer".

When the specularity of the surface of the aluminum film 18 formed on the insulating layer 16 is high, the flatness of the surface of a porous alumina layer that is to be formed later (a porous alumina layer 14 shown in FIG. 1(d)) is also high. A moth-eye mold in which the flatness of the surface of the porous alumina layer 14 is high is suitably used in manufacture of a moth-eye mold that is for use in formation of a clear-type antireflection structure, for example. Note that the clear-type antireflection structure refers to an antireflection structure which does not have an antiglare function.

Then, aluminum is deposited on the insulating layer 16, whereby the aluminum film 18 is formed as shown in FIG. 1(c). The aluminum film 18 is, for example, formed over the entire surface of the insulating layer 16 as shown in FIG. 1(c). The aluminum film 18 can be formed by, for example, depositing aluminum while rotating the support 12 which has the insulating layer 16 on its outer perimeter surface. In the following description, a base which includes the support 12, the insulating layer 16 formed on the outer perimeter surface of the support 12, and the aluminum film 18 formed on the insulating layer 16 as shown in FIG. 1(c) is referred to as "mold base 10".

Then, the surface of the aluminum film 18 is anodized to form a porous alumina layer 14 which has a plurality of minute recessed portions (micropores) over its surface as shown in FIG. 1(d). In this way, a mold 100 is obtained which has the porous alumina layer 14 over its surface.

The porous alumina layer 14 of the mold 100 is formed by anodizing the surface of the aluminum film 18 formed on the insulating layer 16 that is formed on the outer perimeter surface of the support 12, and therefore, the surface of the porous alumina layer 14 has no seam. Thus, since the surface of the mold 100 has no seam, the inverse shape of the plurality of micropores of the porous alumina layer 14 can be transferred without making any seam.

A mold in the form of a roll which includes a seamless porous alumina layer may also be obtained through the following procedure. A polymer film is fixed onto the outer perimeter surface of the hollow cylindrical support such that there is a gap between one end and the opposite end of the polymer film, and thereafter, a resin is supplied into the gap so as to form a resin layer, whereby the gap is filled. Then, aluminum is deposited on the polymer film and the resin layer so as to form an aluminum film, and thereafter, the surface of the aluminum film is anodized to form a porous alumina layer. However, in this mold that is in the form of a roll, there is a probability that stress concentration will occur in the vicinity of the resin layer so that the polymer film can peel off. Also, in the transfer step, the resin layer can readily peel off due to the pressure for transfer. Thus, there is a probability that a piece of the resin which has peeled off will attach to a work to which the structure is to be transferred, so that it can make a mark in the surface of the work. The mold 100 in the form of a roll, which is manufactured according to a manufacturing method of an embodiment of the present invention, includes the insulating layer 16 that is formed on the outer perimeter surface of the support 12. Thus, the mold 100 does not have the above-described gap or resin layer and is therefore free from the above problems.

The mold manufacturing method of an embodiment of the present invention may be used in manufacture of a moth-eye mold in the form of a roll as will be described later. As previously described with reference to FIG. 1(d), a moth-eye mold can be manufactured by repeating etching and anodization after anodization of the aluminum film 18 has been performed.

This moth-eye mold manufacturing method have the following advantages over a case where anodization and etching are performed using a cylindrical aluminum pipe. When anodization and etching were performed using an aluminum pipe, pits with a diameter of about 1 μm were formed in some cases due to a local cell reaction which was caused in the etching step between an impurity element which was present inside the aluminum pipe and an aluminum portion surrounding the impurity element. In the mold manufacturing method of the embodiment of the present invention, the aluminum film 18 is formed by depositing aluminum on the insulating layer 16. Thus, a high-purity aluminum film 18 can be formed. Here, occurrence of a local cell reaction can be prevented in the above etching step, and accordingly, formation of the above pits can be prevented.

Also, in the case where anodization and etching are performed using an aluminum pipe, occurrence of a local cell reaction can be prevented by increasing the purity and, however, the rigidity of the aluminum pipe can decrease. The rigidity can be increased by adding an impurity. However, the presence of the impurity can lead to formation of pits as described above due to a local cell reaction which is caused in the etching step between an impurity and an aluminum portion surrounding the impurity. According to the mold manufacturing method of the embodiment of the present invention, even when an aluminum pipe which contains an impurity is used as the support 12, the insulating layer 16 provides insulation between the support 12 and the aluminum film 18, so that a local cell reaction cannot occur in the aluminum film 18 due to the impurity that is present inside the aluminum pipe. Thus, the support 12 can have both desired purity and desired rigidity.

The above description has been given with the example where a cylindrical pipe which is made of aluminum or stainless steel is used as the support 12. For example, in the case where a metal sleeve is used, a mold may be manufactured by forming an organic insulating layer by means of electrodeposition and thereafter performing an aluminum film formation step and an anodization step. Also, in the case where a metal sleeve is used, the insulating layer 16 may be formed by applying a curable resin (e.g., a polyamic acid or a urethane resin) onto the outer perimeter surface of the metal sleeve according to a spray painting method or a dip coating method to form a curable resin layer and thereafter curing the curable resin. Also, in the case where a metal sleeve is used, an inorganic insulating layer may be formed as the insulating layer 16 on the outer perimeter surface of the metal sleeve.

The support 12 has a hollow cylindrical shape and therefore has a lighter weight than a solid cylindrical support. Therefore, the mold 100 or the mold base 10 which is manufactured using the support 12 has the advantage of better handleability. For example, the above-described anodization and the task of repeating the anodization step and the etching step in a moth-eye mold manufacturing process that will be described later can be performed relatively easily. Particularly in the case of manufacturing a moth-eye mold in the form of a roll which is for use in production of a large-surface antireflection film, it is advantageous because the mold or mold base is large.

In the case where an organic insulating layer is formed by means of electrodeposition as previously described with reference to FIG. 1, a washing step which can be performed as a pretreatment and a washing step and a baking step which can be performed after the electrodeposition step may be performed when necessary in addition to the step of immersion in an electrodeposition solution. These additional steps can be performed relatively easily because the support 12 has a light weight.

If transfer is performed using a mold which is manufactured using a solid cylindrical support, heat will sometimes reside in the mold. A mold which is manufactured using a hollow cylindrical support also has the advantage of reducing accumulation of heat in the transfer step.

As described above, a cylindrical metal pipe or a metal sleeve may be used as the support 12. The metal sleeve advantageously has a lighter weight than the cylindrical metal pipe.

On the other hand, the cylindrical metal pipe has higher rigidity than a flexible metal sleeve, for example. Thus, a mold which is manufactured using a metal pipe as the support 12 is advantageous in that the mold as manufactured can be used in a roll-to-roll method. Here, a mold which is manufactured using a flexible metal sleeve as the support 12 can be used in a roll-to-roll method, with a core member being inserted inside the metal sleeve, for example. The mold which is manufactured using a metal pipe is advantageous in that the step of inserting a core member inside is not necessary, whereas the insertion step is necessary for a mold which is manufactured using a flexible metal sleeve.

In the case where an organic insulating layer is provided as the insulating layer 16, the thickness of the organic insulating layer is, for example, preferably not less than 7 μm from the viewpoint of insulation. The present inventor employed varying applied voltages in the electrodeposition step to prepare a plurality of mold bases with different organic insulating layer thicknesses and examined the insulation in the prepared mold bases. Particularly in mold bases in which the thickness of the organic insulating layer was not less than 7 μm, sufficient insulation was achieved.

In the case where an organic insulating layer is provided as the insulating layer 16, it is preferred to provide an inorganic underlayer which is made of an inorganic oxide, for example, between the organic insulating layer and the aluminum film 18. Providing the inorganic underlayer can improve the adhesion between the organic insulating layer and the aluminum film 18. The inorganic oxide layer is preferably a silicon oxide layer or a titanium oxide layer, for example. The inorganic underlayer may be an inorganic nitride layer. The inorganic nitride layer is preferably a silicon nitride layer, for example.

Forming a buffer layer which contains aluminum on the inorganic underlayer is preferred. The buffer layer functions to improve adhesion between the inorganic underlayer and the aluminum film 18. Also, the buffer layer protects the inorganic underlayer from acid.

The buffer layer preferably contains aluminum and oxygen or nitrogen. Although the content of oxygen or nitrogen may be constant, it is particularly preferred that the buffer layer has a profile such that the aluminum content is higher on the aluminum film 18 side than on the inorganic underlayer side. This is because excellent conformity in physical property values, such as the thermal expansion coefficient, is achieved.

The profile of the aluminum content in the buffer layer along the depth direction may change stepwise or may change continuously. For example, when the buffer layer is formed of aluminum and oxygen, a plurality of aluminum oxide layers are formed such that the oxygen content gradually decreases, in such a manner that an aluminum oxide layer which is closer to the aluminum film 18 has a lower oxygen content, and the aluminum film 18 is formed on the uppermost aluminum oxide layer. In other words, a plurality of aluminum oxide layers are formed so as to have a profile such that the aluminum content is higher on the aluminum film 18 side than on the inorganic underlayer side.

By forming a plurality of aluminum oxide layers such that the oxygen content gradually decreases in such a manner that an aluminum oxide layer which is closer to the aluminum film 18 has a lower oxygen content, an aluminum oxide layer which is closer to the aluminum film 18 has a higher thermal expansion coefficient and has a thermal expansion coefficient which is closer to the thermal expansion coefficient of the aluminum film 18. As a result, the aluminum film 18 formed has a strength to withstand the thermal stress which is caused by repeating the anodization that is performed at a relatively low temperature and the etching that is performed at a relatively high temperature, and has high adhesion property.

For example, in the case where the buffer layer is formed by two aluminum oxide layers, the buffer layer may be configured such that the oxygen content of the aluminum oxide layer on the inorganic underlayer side (e.g., on the $SiO_2$ layer side) is not less than 30 at % and not more than 60 at %, the oxygen content of the aluminum oxide layer on the aluminum film 18 side is not less than 5 at % and not more than 30 at %, and the oxygen contents of the two aluminum oxide layers satisfy the above-described relationship.

In the case where the buffer layer is formed by three aluminum oxide layers, for example, the buffer layer may be configured such that the oxygen content of the aluminum oxide layer on the inorganic underlayer side is not less than 35 at % and not more than 60 at %, the oxygen content of the middle aluminum oxide layer is not less than 20 at % and not more than 35 at %, the oxygen content of the aluminum oxide layer on the aluminum film 18 side is not less than 5 at % and not more than 20 at %, and the oxygen contents of the three aluminum oxide layers satisfy the above-described relationship. As a matter of course, the buffer layer may be formed by four or more aluminum oxide layers. Note that the oxygen content can be obtained by, for example, X-ray photoelectron spectroscopy (ESCA).

The buffer layer may be formed by, for example, using any of the three methods (1) to (3) described below.

(1) The film is formed by reactive sputtering with the use of a mixture gas of Ar gas and $O_2$ gas and an Al target which contains the oxygen element. Here, the oxygen content in the target is preferably not less than 1 at % and not more than 40 at %. If the oxygen content in the target is less than 1 at %, the effects of oxygen contained in the target are insufficient. If the oxygen content in the target is more than 40 at %, the $O_2$ gas is unnecessary.

(2) The film is formed by reactive sputtering with the use of a pure Ar gas as the sputtering gas and an Al target which contains the oxygen element. Here, the oxygen content in the target is preferably not less than 5 at % and not more than 60 at %. If the oxygen content in the target is less than 5 at %, the amount of oxygen contained in the formed aluminum oxide layer may be insufficient. If the oxygen content in the target is more than 60 at %, the content of the oxygen element in the formed aluminum oxide layer may be excessively high. If the content of the oxygen element in the aluminum oxide layer which is closer to the inorganic underlayer is more than 60 at %, the adhesion between the inorganic underlayer ($SiO_2$) and the aluminum oxide layer may deteriorate.

(3) The film is formed by reactive sputtering with the use of a pure aluminum target. Here, the flow rate ratio of the Ar gas and the $O_2$ gas of the mixture gas used in the sputtering is, approximately, more than 2:0 and not more than 2:1. If the flow rate ratio of the Ar gas and the $O_2$ gas is more than 2:1, the content of the oxygen element in the formed aluminum oxide layer may be excessively high.

The buffer layer used may be formed by a single aluminum oxide layer. A buffer layer which contains aluminum and nitrogen may also be formed in the same way as that described above. The thickness of the buffer layer is preferably not more than 1 μm from the viewpoint of productivity.

When the inorganic underlayer is made of an inorganic oxide or inorganic nitride as described above, the thermal expansion coefficient of the inorganic underlayer is preferably adapted to the thermal expansion coefficients of adjacent layers, such as the organic insulating layer and the buffer layer, by adding an impurity to the inorganic oxide or inorganic nitride. For example, when a silicon oxide layer is formed as the inorganic underlayer, the thermal expansion coefficient can be increased by adding germanium (Ge), phosphorus (P), or boron (B). When 5 mass % Ge is added to the silicon oxide, for example, the thermal expansion coefficient is about $2.8 \times 10^{-6}/°$ C., which is about three times that obtained when Ge is not added.

The inorganic underlayer may be formed by sputtering as described above. For example, the inorganic underlayer may be formed by DC reactive sputtering or RF sputtering.

The thickness of the inorganic underlayer is preferably not more than 500 nm and, more preferably, not more than 300 nm. If the thickness of the inorganic underlayer is large, the time required for formation of the inorganic underlayer will be unduly long. If the thickness of the inorganic underlayer is more than 500 nm, the adhesion of the aluminum layer 18 may deteriorate due to thermal stress (shear stress) which is attributed to the difference in thermal expansion coefficient between the inorganic underlayer and the aluminum layer 18.

In view of the adhesion of the aluminum layer 18, the thickness of the inorganic underlayer is preferably not less than 50 nm. In the case where the film is formed by sputtering, the adhesion may probably deteriorate if the number of pinholes formed in the film is equal to or greater than a certain number. Therefore, the inorganic underlayer preferably has a smaller number of pinholes. In view of preventing formation of pinholes, the thickness of the inorganic underlayer is preferably not less than 70 nm. The present inventor prepared seven samples, in which the $SiO_2$ layers were formed by RF sputtering to have different thicknesses, 15 nm, 30 nm, 50 nm, 70 nm, 100 nm, 150 nm, and 300 nm, and found that the adhesion was sufficient when the thickness of the $SiO_2$ layer was not less than 50 nm, and that formation of pinholes was prevented when the thickness of the $SiO_2$ layer was not less than 70 nm.

When an organic insulating layer is provided as the insulating layer 16, plasma ashing is preferably performed on the surface of the organic insulating layer. Performing plasma ashing can improve the adhesion between the organic insulating layer and the aluminum film 18 that is formed on the organic insulating layer.

The present inventor prepared a plurality of mold bases (the mold base 10 shown in FIG. 1(*c*)) under different film formation conditions for the aluminum film and examined the effects of the difference in film formation conditions on the adhesion of the aluminum film. The experimental results of the examination are described below.

The mold bases were prepared under six different film formation conditions as described below. In the following description, the mold bases which were prepared under six different film formation conditions are referred to as mold bases 30A, 30B, 30C, 30D, 30E and 30F.

Firstly, a substrate (5 cm×10 cm) which was made of stainless steel was provided.

Then, a 15 µm thick organic insulating layer was formed on the surface of the substrate by means of electrodeposition. The electrodeposition resin used was an acrylic melamine resin.

Then, an aluminum film was formed under varying film formation conditions as described below.

For the mold base 30A, a 1 µm thick aluminum film was formed directly on the surface of the organic insulating layer (15 µm thick acrylic melamine layer).

For the mold base 30B, plasma ashing was performed on the surface of the organic insulating layer, and thereafter, a 100 nm thick inorganic underlayer ($SiO_2$ layer), a buffer layer (an AlO layer (150 nm thick) and an aluminum oxide layer (150 nm thick) in which the oxygen content gradually decreases toward the aluminum film), and a 1 µm thick aluminum film were formed in this order by sputtering.

For the mold base 30C, after the plasma ashing, a 100 nm thick $SiO_2$ layer, a buffer layer (an AlO layer (200 nm thick) and an aluminum oxide layer (200 nm thick) in which the oxygen content gradually decreases toward the aluminum film), and a 1 µm thick aluminum film were formed in this order.

For the mold bases 30D and 30E, after the plasma ashing, a $SiO_2$ layer which has the same thickness as that of the mold base 30C and a buffer layer which has the same structure and the same thickness as those of the buffer layer of the mold base 30C were formed. The mold base 30C and the mold bases 30D and 30E were different in the sputtering power for the aluminum film. For the mold bases 30D and 30E, the sputtering power for formation of the aluminum film was low as compared with the mold bases 30B and 30C. For the mold base 30E, the sputtering power for formation of the AlO layer was high as compared with the mold bases 30B, 30C and 30D.

For the mold base 30F, after the plasma ashing, a 100 nm thick $SiO_2$ layer, a buffer layer (an AlO layer (400 nm thick) and an aluminum oxide layer (400 nm thick) in which the oxygen content gradually decreases toward the aluminum film), and a 1 µm thick aluminum film were formed in this order. The sputtering power for the aluminum film and the AlO layer was the same as that of the mold base 30E.

The mold bases 30A to 30F were evaluated in terms of the adhesion of aluminum by a peeling test as will be described below.

The aluminum film formed on the organic insulating layer was cut into a matrix of 5×5 squares, each having a size of 1 cm×1 cm, using a utility knife, with the incision reaching the surface of the organic insulating layer. An adhesive tape (Kapton tape manufactured by Permacel) was tightly placed onto the aluminum film so as to cover a region of the cut squares and then peeled off from the aluminum film. The number of squares which were removed together with the peeled adhesive tape was counted for evaluation of the adhesion of the aluminum film. When the number of removed squares was not more than five, it was determined that the adhesion was sufficient. The results are shown in Table 1.

The mold bases were immersed in a phosphoric acid aqueous solution for 100 minutes for examining the adhesion of the aluminum film. The phosphoric acid aqueous solution is used as an etching solution in a moth-eye mold manufacturing process which will be described later. If immersion of a mold base in the phosphoric acid aqueous solution causes peeling off of the aluminum film, there is a probability that, in the moth-eye mold manufacturing process with that mold base, the aluminum film will peel off, leading to a failure to manufacture a desired moth-eye mold. The adhesion of the aluminum film immersed in the phosphoric acid aqueous solution was examined by observing the aqueous solution with a human eye as to whether or not it had white turbidity. In the row of "White turbidity of aqueous solution after immersion in phosphoric acid aqueous solution" of Table 1, ⊚ means that substantially no white turbidity was observed, ○ means that white turbidity was slightly observed, and Δ means that white turbidity was observed.

Further, anodization and etching were repeated using the mold bases 30A to 30F, whereby moth-eye molds were manufactured. The moth-eye molds were manufactured by alternately performing the anodization step and the etching step through 5 cycles (including 5 anodization cycles and 4 etching cycles). The anodization step was performed with an applied voltage of 80 V for 37 seconds using an oxalic acid aqueous solution (concentration: 0.3 wt %, solution temperature: 18° C.). The etching step was performed for 29 minutes using a phosphoric acid aqueous solution (concentration: 1 mol/l, solution temperature: 30° C.) The obtained moth-eye molds were subjected to the same peeling test as that described above. The results are shown in Table 1.

TABLE 1

| Mold Base | 30A | 30B | 30C | 30D | 30E | 30F |
|---|---|---|---|---|---|---|
| Number of squares removed from mold base | 0 | 0 | 0 | 0 | 0 | 0 |
| White turbidity of aqueous solution after immersion in phosphoric acid aqueous solution | — | Δ | Δ | Δ | ○ | ◎ |
| Number of squares removed from moth-eye mold | 25 | 25 | 5 | 5 | 3 | 0 |

As seen from Table 1, in each of the mold bases 30A to 30F, the number of removed squares was zero (0). This means that the adhesion of the aluminum film was high.

The mold base was immersed in the phosphoric acid aqueous solution for 100 minutes. For the mold bases 30B, 30C, and 30D, the solution surface of the phosphoric acid aqueous solution became turbid and whitish. The reason why the phosphoric acid aqueous solution became turbid and whitish is probably that part of the aluminum film was dissolved into the phosphoric acid aqueous solution, and external light was scattered by tiny pieces of the aluminum film in the aqueous solution, so that the solution was observed to have white turbidity. The phosphoric acid aqueous solution in which the mold base 30E was immersed was observed to slightly have white turbidity. The phosphoric acid aqueous solution in which the mold base 30F was immersed was observed to have substantially no white turbidity. For the mold base 30A, the aluminum film was entirely peeled off.

Moth-eye molds which were manufactured using the mold bases 30A and 30B were subjected to the peeling test, and the aluminum film and the porous alumina layer were entirely peeled off. In each of moth-eye molds which were manufactured using the mold bases 30C, 30D, 30E and 30F, the number of removed squares was not more than five. This means that the adhesion was high. In moth-eye molds which were manufactured using the mold bases 30E and 30F, the number of removed squares was particularly small. In the moth-eye mold which was manufactured using the mold base 30F, the number of removed squares was zero (0), which was the smallest among them.

As described above, in the mold bases 30B, 30C, 30D, 30E and 30F in which plasma ashing was performed on the surface of the organic insulating layer before the inorganic underlayer (SiO$_2$ layer) and the buffer layer were formed, the adhesion of the aluminum film was high as compared with the mold base 30A in which the aluminum film was deposited directly on the surface of the organic insulating layer. Thus, it was confirmed that the adhesion of the aluminum film can be improved by performing the plasma ashing before formation of the inorganic underlayer and the buffer layer.

Comparing the mold bases 30D and 30E, the mold base 30E for which the sputtering power for formation of the AlO layer of the buffer layer was higher exhibited higher adhesion.

It is inferred that the difference in adhesion is attributed to the difference in film quality of the buffer layer, which is attributed to the difference in the sputtering power for the buffer layer. When the buffer layer is formed by sputtering, vacancies may sometimes be formed inside the buffer layer. When the mold base is immersed in the phosphoric acid aqueous solution, the phosphoric acid aqueous solution entering through vacancies which are present in the aluminum film comes into contact with the buffer layer, so that part of the buffer layer is dissolved away. Further, if there are vacancies inside the buffer layer, an etching solution will enter the vacancies of the buffer layer, so that the buffer layer is likely to be dissolved. As a result, it is inferred that, if the number of vacancies in the buffer layer is relatively large, part of the aluminum film overlying the buffer layer will be likely to peel off.

Figure 2:
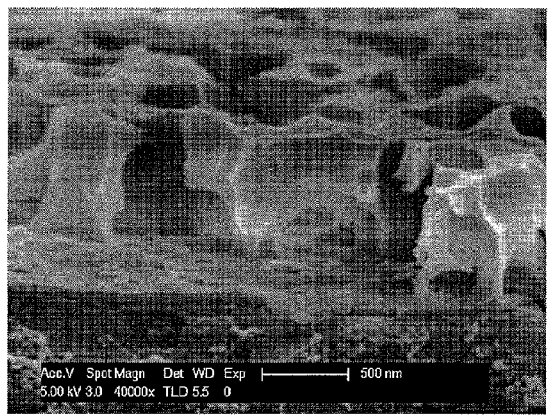
[FIG. 2] A cross-sectional SEM image of a base after immersion in a phosphoric acid aqueous solution, the base including a $SiO_2$ layer, a buffer layer, and an aluminum film which were formed in this order on a polymer film.

A mold base which was prepared by forming a 100 nm thick SiO$_2$ layer, a buffer layer (a 200 nm thick AlO layer and a 200 nm thick aluminum oxide layer with the oxygen content varying along the thickness direction), and an aluminum film in this order, under the same conditions as those of the mold base 30D, on a polymer film instead of the stainless steel substrate and the organic insulating layer for the purpose of observing a cross section, was immersed in a phosphoric acid aqueous solution for 100 minutes in order to examine the tolerance for the phosphoric acid aqueous solution. FIG. 2 shows a scanning electron microscope (SEM) image of a cross section of this mold base after having been immersed in the phosphoric acid aqueous solution.

As seen from FIG. 2, there are voids in an inner part at a depth of several hundreds of nanometers from the surface (i.e., in the buffer layer). It is inferred that the aluminum film had vacancies, and the phosphoric acid aqueous solution entering through the vacancies of the aluminum film dissolved part of the buffer layer. It is also inferred that the phosphoric acid aqueous solution which has entered the vacancies of the buffer layer dissolved the buffer layer.

As seen from FIG. 2, there are a plurality of voids of the aluminum film in the surface, which have a diameter of about several hundreds of nanometers. It is inferred that some of the voids were formed by dissolution of the aluminum film, and others were attributed to that the aluminum film overlying the buffer layer was more likely to peel off in a portion where the buffer layer was dissolved.

It is inferred that the relatively low adhesion of the aluminum film of the mold base 30D was attributed to the fact that dissolution of the buffer layer such as shown in FIG. 2 was likely to occur in the mold base 30D. It is inferred that, in the mold base 30D for which the sputtering power in formation of the buffer layer was low, there were many vacancies in the buffer layer, and the buffer layer was likely to be dissolved in the phosphoric acid aqueous solution. On the other hand, it is inferred that, in the mold base 30E, a relatively dense film was successfully formed, so that the buffer layer was less likely to be dissolved, and the adhesion of the aluminum film was high.

Comparing the buffer layer and the porous alumina layer, the porous alumina layer is less likely to be dissolved in the phosphoric acid aqueous solution. For example, a porous alumina layer which is formed by anodization with the use of an oxalic acid contains a complex which includes aluminum and the oxalic acid (e.g., Toshihiko SATO and Kyoko KAMINAGA, *New Alumilite Theory* (1997), Kallos Publishing Co. Ltd.), and the porous alumina layer is a relatively dense film. Therefore, when immersed in the phosphoric acid aqueous solution, for example, the porous alumina layer is relatively unlikely to be dissolved in that solution. Comparing the mold bases 30D and 30E, the sputtering power for the aluminum film and the thickness of the aluminum film were equal. However, the mold base 30E had a smaller number of removed squares after the anodization and the etching than the mold base 30D. This is probably because, in the mold base 30E, the film quality of the buffer layer that is likely to be dissolved in the phosphoric acid aqueous solution was improved. After immersion of the mold base 30D in the phosphoric acid aqueous solution, the aqueous solution was observed to have white turbidity. It is probably for the same reason that white turbidity was only slightly observed in the phosphoric acid aqueous solution in which the mold base 30E was immersed.

Comparing the mold bases 30C and 30D, the mold base 30D for which the sputtering power in formation of the aluminum film was lower exhibited higher adhesion. It is inferred that decreasing the sputtering power for the aluminum film prevented growth of crystal grains and contributed to formation of a relatively dense aluminum film.

Comparing the mold bases 30B and 30C, the mold base 30C in which the thickness of the buffer layer was greater exhibited higher adhesion. It is inferred that the greater thickness of the buffer layer contributed to formation of a dense film and improved the adhesion. Both the mold bases 30E and 30F exhibited high adhesion of the aluminum film. The mold base 30F exhibited particularly high adhesion of the aluminum film. It is inferred that the greater thickness of the buffer layer in the mold base 30F contributed to formation of a dense film.

Next, a mold manufacturing method of another embodiment of the present invention is described in detail with reference to FIGS. 3(a) to 3(d). FIGS. 3(a) to 3(d) are schematic cross-sectional views for illustrating the mold manufacturing method of another embodiment of the present invention.

Firstly, a support 72 in the form of a roll and a tubular resin film 76 are provided as shown in FIG. 3(a).

The support 72 used may be a hollow cylindrical support which is the same as the above-described support 12 (FIG. 1(a)) (for example, a metal pipe or a metal sleeve). Alternatively, the support 72 used may be a solid cylindrical support. The solid cylindrical support may be a solid cylindrical pole which is made of a metal (e.g., a solid stainless steel pole or a solid aluminum pole). Using a flexible metal sleeve as the support 72 provides an advantage that the step of adhering the tubular resin film 76 to the outer perimeter surface of the metal sleeve can be easily performed as will be described later.

The tubular resin film 76 may be, for example, a polyimide seamless film. The polyimide seamless film may be available from, for example, NITTO DENKO CORPORATION and GUNZE LIMITED.

Then, the tubular resin film 76 is adhered to the outer perimeter surface of the support 72 as shown in FIG. 3(b). For example, when a flexible metal sleeve is used as the support 72, the metal sleeve is inserted into the tubular resin film 76 in such a manner that the metal sleeve is maintained in a bent state during the insertion, and thereafter, the metal sleeve is caused to recover from the bent state such that the tubular resin film 76 adheres to the outer perimeter surface of the metal sleeve. An example of the method of adhering the tubular resin film 76 to the outer perimeter surface of the support 72 will be described later.

Then, aluminum is deposited on the tubular resin film 76, whereby an aluminum film 18 is formed as shown in FIG. 3(c). In this way, a mold base 10a is obtained.

Then, the surface of the aluminum film 18 is anodized to form a porous alumina layer 14 which has a plurality of minute recessed portions (micropores) as shown in FIG. 3(d). In this way, a mold 100a is obtained which includes the porous alumina layer 14 over its surface.

Hereinafter, an example of the method of adhering the tubular resin film 76 to the outer perimeter surface of the support 72 is described.

Figure 4:
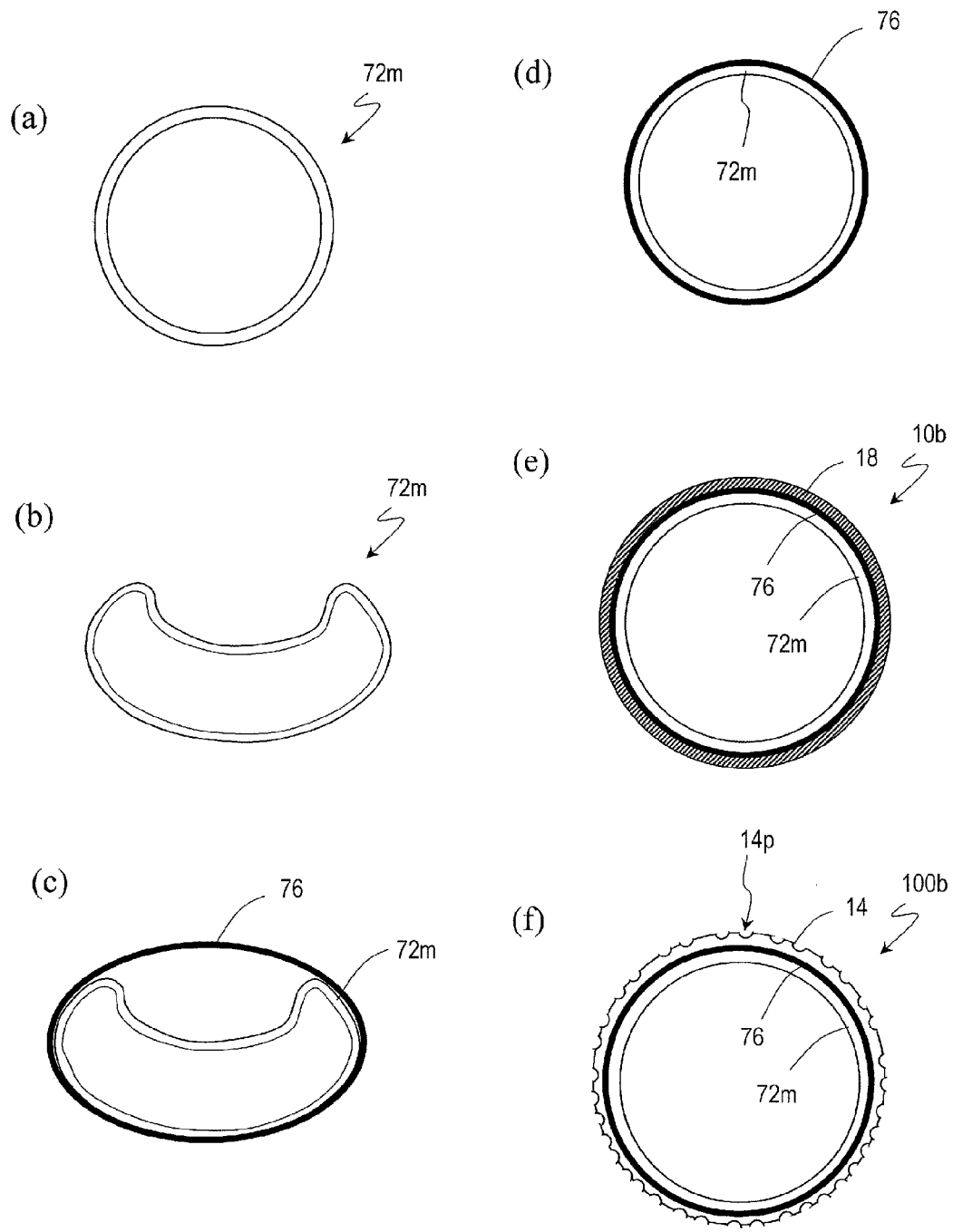
[FIG. 4] (a) to (f) are diagrams for illustrating a mold manufacturing method of an embodiment of the present invention.
Figure 5:
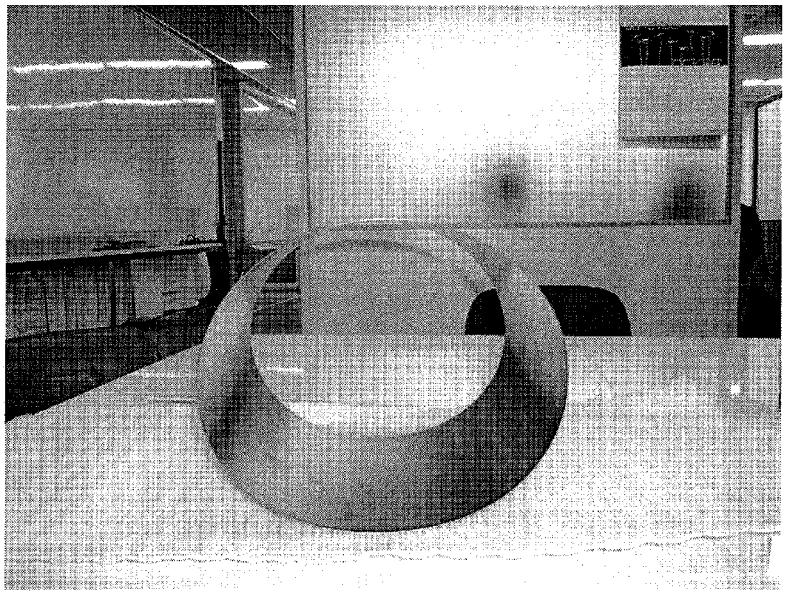
[FIG. 5] Optical images seen in an axial direction of a metal sleeve. (a) shows a state of the metal sleeve which is not bent. (b) shows a state of the metal sleeve which is bent.
Figure 5:
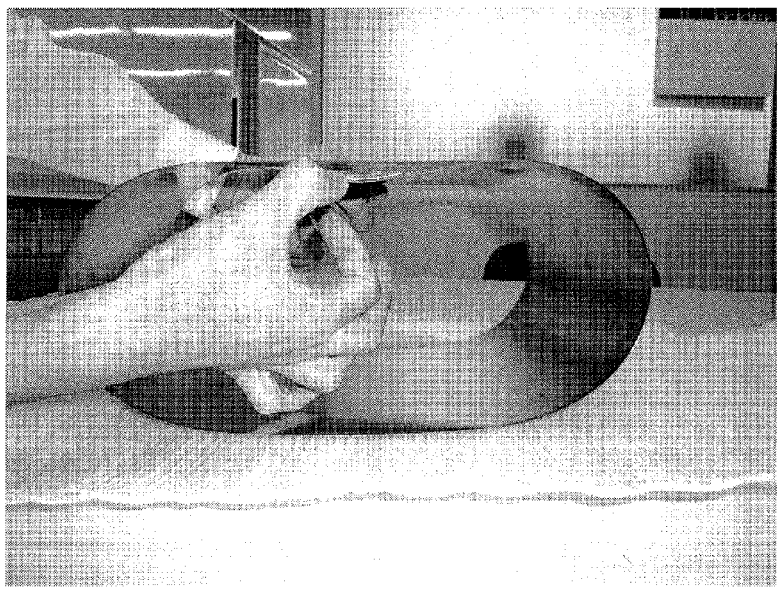

First, an adhering method which is employed when a flexible metal sleeve is used as the support 72 is described with reference to FIG. 4 and FIG. 5. One outstanding feature of the method which is described hereinbelow resides in that a metal sleeve 72m is inserted into the tubular resin film 76 in such a manner that the metal sleeve 72m is maintained in a bent state during the insertion, and thereafter, the metal sleeve 72m is caused to recover from the bent state such that the tubular resin film 76 adheres to the outer perimeter surface of the metal sleeve 72m. FIGS. 4(a) to 4(f) are schematic cross-sectional views for illustrating a mold manufacturing method where the metal sleeve 72m is used. Note that the cross-sectional views of FIGS. 4(a) to 4(f) are perpendicular to the axial direction.

Firstly, the metal sleeve 72m and the tubular resin film 76 (not shown) are provided as shown in FIG. 4(a).

Then, the metal sleeve 72m is bent as shown in FIG. 4(b). In this step, the metal sleeve 72m is bent radially inward as shown in FIG. 4(b).

This step is described in detail with reference to FIG. 5. FIG. 5 are optical images showing a metal sleeve that is made of nickel (Ni), with a diameter of 253 mm, a thickness of 200 μm, and a length (axial length) of 300 mm, which are seen in the axial direction. FIG. 5(a) shows a state of the metal sleeve which is not bent. FIG. 5(b) shows a state of the metal sleeve which is bent. FIG. 5(b) shows a bent state which was created by placing a long-length bar that was longer than the metal sleeve on the outer perimeter surface of the metal sleeve so as to be parallel with the axial direction of the metal sleeve and pushing down the opposite ends of the long-length bar so as to uniformly exert a force. In the step of bending the metal sleeve 72m as shown in FIG. 4(b), the metal sleeve 72m is bent by exerting a force on part of the outer perimeter surface of the metal sleeve 72m as described above.

Then, the metal sleeve 72m is inserted into the tubular resin film 76 in such a manner that the metal sleeve 72m is maintained in a bent state during the insertion as shown in FIG. 4(c). The metal sleeve 72m is maintained in a bent state where the outside diameter is smaller than that of the normal state, so that the metal sleeve 72m can be easily inserted into the tubular resin film 76.

Then, the metal sleeve 72m is caused to recover from the bent state such that the tubular resin film 76 adheres to the outer perimeter surface of the metal sleeve 72m as shown in FIG. 4(d).

Then, aluminum is deposited on the tubular resin film 76, whereby the aluminum film 18 is formed as shown in FIG. 4(e). In this way, a mold base 10b is obtained.

Then, the surface of the aluminum film 18 is anodized to form a porous alumina layer 14 which has a plurality of minute recessed portions (micropores) 14p as shown in FIG. 4(f). In this way, a mold 100b is obtained.

According to the above-described method, the tubular resin film 76 can be easily adhered to the outer perimeter surface of the metal sleeve 72m. This is advantageous over a case where an element which cannot be bent like the flexible metal sleeve 72m, such as a cylindrical aluminum pipe, a cylindrical stainless steel pipe, a solid cylindrical aluminum pole, and a solid cylindrical stainless steel pole, for example, is used as the support 72.

As the tubular resin film 76, for example, a polyimide seamless film may be used as described above. In this case, the imidization rate of the film may be not more than 99%. For example, the metal sleeve 72m is placed inside a polyimide film whose imidization rate is about 80%, and thereafter, the polyimide film is imidized till the imidization rate reaches about 99% such that the polyimide film shrinks, whereby the polyimide film is adhered to the outer perimeter surface of the metal sleeve 72m. The polyimide film may be thermally imidized or may be chemically imidized.

Using a polyimide film whose imidization rate is not more than 99% provides an advantage that the adhesion and the adhesive property of the tubular resin film 76 to the metal sleeve 72m can be improved because the polyimide film shrinks through imidization.

The method of calculating the imidization rate may be, for example, a method described in Japanese Laid-Open Patent Publication No. 2008-045054. First, the absorbances for 1350 cm$^{-1}$ and 1470 cm$^{-1}$ of a polyimide film whose imidization rate is 100% and a polyimide film which is a subject of measurement are measured using, for example, the Fourier infrared spectrophotometer, FT-IR Spectrum One (manufactured by PerkinElmer). Then, the measured absorbances are used to calculate the imidization rate based on Formula (1) shown below (see Japanese Laid-Open Patent Publication No. 2008-045054):

$$\text{Imidization Rate } (\%) = [(A_1/B_1)/(A_0/B_0)] \times 100 \quad (1)$$

where $A_1$: Absorbance for 1470 cm$^{-1}$ of the measurement subject polyimide film,
$B_1$: Absorbance for 1350 cm$^{-1}$ of the measurement subject polyimide film,
$A_0$: Absorbance for 1470 cm$^{-1}$ of the 100% imidization rate polyimide film, and
$B_0$: Absorbance for 1350 cm$^{-1}$ of the 100% imidization rate polyimide film.

The 100% imidization rate polyimide film mentioned above can be prepared by, for example, thermally treating the measurement subject polyimide film in vacuum at the surface temperature of 360° C. for one hour. Note that the infrared absorption at 1350 cm$^{-1}$ represents the characteristic absorption of an imide ring, and the infrared absorption at 1470 cm$^{-1}$ represents the characteristic absorption of an alicyclic compound.

The above description has been given with the example where the flexible metal sleeve 72m is used as the support 72. When a cylindrical metal pipe or a solid cylindrical metal pole is used as the support 72, a polyimide seamless film can also be used as the tubular resin film 76. Note that, for example, in a polyimide seamless film whose imidization rate is not more than 99%, the diameter of the inner perimeter surface is large as compared with, for example, a polyimide seamless film whose imidization rate is more than 99%. Therefore, when a metal pipe or a solid cylindrical metal pole is used as the support 72, it cannot be bent like the metal sleeve 72m. However, as described above, a polyimide seamless film whose imidization rate is not more than 99% is used, and after insertion of the support 72 in the seamless film, the seamless film is imidized so as to shrink. In this way, the tubular resin film 76 can be adhered relatively easily.

Another method of adhering the tubular resin film 76 to the support 72 is, for example, inserting the tubular resin film 76 in such a manner that the support 72 is maintained in a shrunk state during the insertion by cooling the support 72 and then restoring the support 72 to the normal temperature such that the support 72 recovers its original size, so that the tubular resin film 76 can adhere to the outer perimeter surface of the support 72.

Alternatively, as will be described below, the support 72 and the tubular resin film 76 may be adhered to each other by inserting the support 72 into the tubular resin film 76 at the normal temperature and, thereafter, heating the support 72 and the tubular resin film 76 and then restoring the support 72 and the tubular resin film 76 to the normal temperature.

Firstly, the support 72 and the tubular resin film 76 are provided. Here, the diameter of the outer perimeter surface of the support 72 is smaller than the diameter of the inner perimeter surface of the tubular resin film 76.

Then, the support 72 is inserted into the tubular resin film 76.

Then, the support 72 and the tubular resin film 76 are heated. For example, when a polyimide seamless film is used as the tubular resin film 76, the support 72 and the tubular resin film 76 are heated to about 300° C. By heating, the imidization rate of the polyimide seamless film increases, and the polyimide seamless film shrinks, so that the difference between the diameter of the inner perimeter surface of the seamless film and the diameter of the outer perimeter surface of the support 72 decreases. Therefore, the support 72 and the tubular resin film 76 can adhere to each other.

Thereafter, the support 72 and the tubular resin film 76 are restored to the normal temperature.

Here, by employing a film whose linear expansion coefficient is greater than the linear expansion coefficient of the support 72 as the tubular resin film 76, the adhesion between these elements at the normal temperature can be improved. After having been heated as described above, the support 72 and the tubular resin film 76 shrink till they are restored to the normal temperature. When the linear expansion coefficient of the tubular resin film 76 is greater than the linear expansion coefficient of the support 72, the shrink rate of the tubular resin film 76 that shrinks till it is restored to the normal temperature is relatively large. Therefore, the adhesion of the tubular resin film 76 to the support 72 can be improved.

The linear expansion coefficient of the polyimide resin is 5 to 40 ppm/° C. For example, the linear expansion coefficient of aluminum is about 23.6 ppm/° C. The linear expansion coefficient of iron is about 11.7 ppm/° C. The linear expansion coefficient of nickel is about 12.8 ppm/° C. The linear expansion coefficient of JIS standards SUS304 stainless steel is about 17.3 ppm/° C. The linear expansion coefficient of JIS standards SUS430 stainless steel is about 10.4 ppm/° C. The linear expansion coefficient of the polyimide film varies depending on the type of polyimide. In the case where, as described above, the support 72 is inserted into the tubular resin film 76 at the normal temperature and the support 72 and the tubular resin film 76 are heated and then restored to the normal temperature such that the support 72 and the tubular film 76 adhere to each other, when a polyimide film is used as the tubular resin film 76, the polyimide film is preferably selected such that the linear expansion coefficient of the polyimide film is greater than the linear expansion coefficient of the support 72. Note that, particularly, a polyimide film whose linear expansion coefficient is 10 to 40 ppm/° C. is advantageous in that it is relatively readily available and it can be manufactured at a low cost.

When a cylindrical metal pipe or a solid cylindrical metal pole is used as the support 72 and the tubular resin film 76 is adhered according to the above-described method, the support 72 is inserted into the tubular resin film 76 before the tubular resin film 76 is adhered to the outer perimeter surface of the support 72. Therefore, it is preferred that, in the phase where the support 72 is inserted into the tubular resin film 76, the inside diameter of the tubular resin film 76 (the diameter of the inner perimeter surface) is greater than the outside diameter of the support 72 (the diameter of the outer perimeter surface). According to the researches conducted by the present inventor, for example, when a support whose outside diameter is 150 mm is used as the support 72 and a polyimide seamless film is adhered, if in the phase of insertion of the support 72 the difference between the outside diameter of the support 72 and the inside diameter of the tubular resin film 76 is not less than 600 μm, the support 72 can easily be inserted into the tubular resin film 76.

When the flexible metal sleeve 72m is used as the support 72, the metal sleeve 72m is inserted into the tubular resin film 76 in such a manner that the metal sleeve 72m is maintained in a bent state during the insertion as described above. Therefore, the difference between the outside diameter of the metal sleeve 72m and the inside diameter of the tubular resin film 76 may be small, or may be generally equal, as compared with a case where a cylindrical metal pipe or a solid cylindrical metal pole is used as the support 72. Thus, there is an advantage that the adhesion between the metal sleeve 72m and the tubular resin film 76 is readily achieved as compared with a case where a metal pipe or a solid cylindrical metal pole is used.

Figure 6:
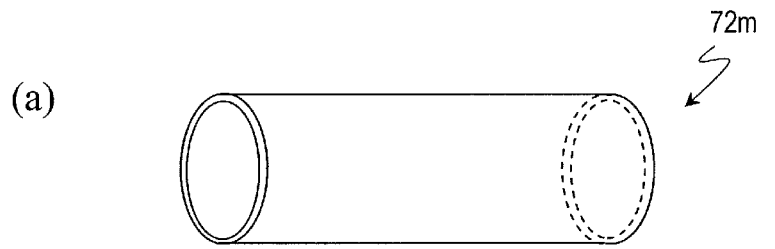
[FIG. 6] (a) to (e) are diagrams for illustrating a mold manufacturing method of an embodiment of the present invention.
Figure 6:
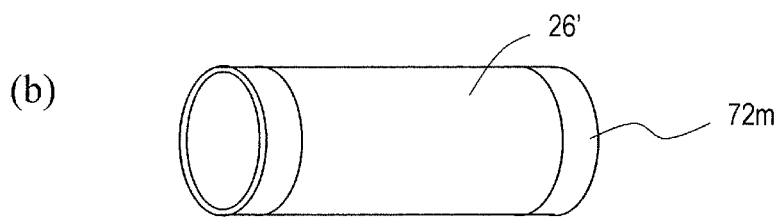
Figure 6:
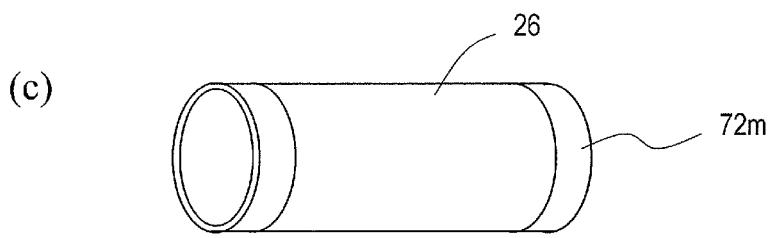
Figure 6:
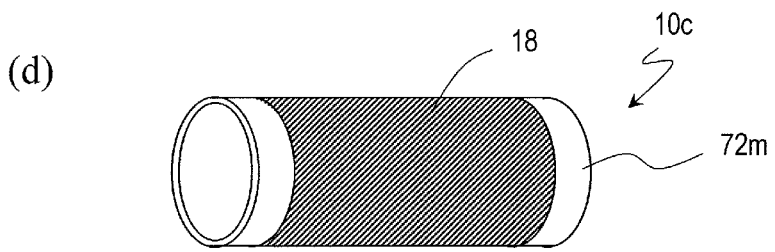
Figure 6:
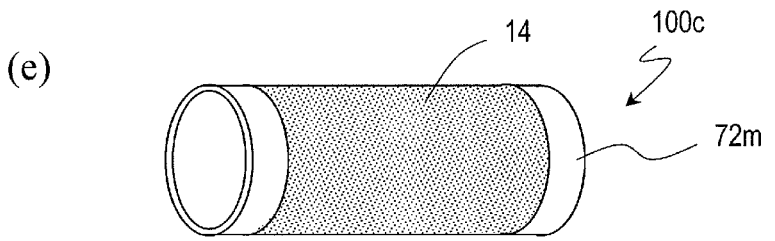

Next, another mold manufacturing method with the use of the metal sleeve 72m is described with reference to FIG. 6. In the manufacturing method which has been previously described, the tubular resin film 76 which is preliminarily formed on the metal sleeve 72m is adhered, whereas the method which will be described below includes applying a curable resin on the outer perimeter surface of the metal sleeve 72m so as to form a tubular resin film on the outer perimeter surface of the metal sleeve 72m.

First, a metal sleeve 72m and a curable resin (not shown) are provided as shown in FIG. 6(a).

Then, a curable resin is applied to the outer perimeter surface of the metal sleeve 72m, whereby a curable resin layer 26' is formed as shown in FIG. 6(b). The curable resin used may be, for example, a resin which contains a polyamic acid.

Then, the curable resin layer 26' is cured, whereby a tubular resin films 26 is formed on the outer perimeter surface of the metal sleeve 72m as shown in FIG. 6(c). For example, when the curable resin used is a thermosetting polyamic acid, the curable resin is heated to about 300° C., whereby a tubular polyimide film is formed.

Then, aluminum is deposited on the tubular resin film 26, whereby an aluminum film 18 is formed as shown in FIG. 6(d).

Then, the surface of the aluminum film 18 is anodized to form a porous alumina layer 14 which has a plurality of minute recessed portions, whereby a mold 100c is obtained as shown in FIG. 6(e).

In the above-described method, when the curable resin layer 26' is heated to a relatively high temperature for curing, it is preferred that the metal sleeve 72m has high heat resistance. When the polyamic acid is used for the curable resin and the curable resin is thermally imidized as described above, it is necessary to heat it to about 300° C. For example, it is preferred to use a metal sleeve which is made of a metal that has high heat resistance, such as stainless steel.

In the case where a cylindrical metal pipe or a solid cylindrical metal pole is used as the support 72, the tubular resin film 26 may also be formed by applying a curable resin to the outer perimeter surface of the support 72 to form a curable resin layer and then curing the curable resin as previously described with reference to FIG. 6.

Alternatively, the tubular resin film 76 may be adhered by placing a shrink film so as to cover the outer perimeter surface of the support 72 and heating the shrink film such that shrinks. The shrink film may be, for example, a PET film, a polyolefin film, a polystyrene film, a vinyl chloride film, or the like. For example, a G-tube product manufactured by Gunze Koubunshi Co., Ltd. may be used.

Whichever of the above-described methods is employed, an adhesive agent may be applied between the tubular resin film 26, 76 and the support 72 in order to fix the tubular resin film 26, 76 onto the outer perimeter surface of the support 72.

As described above, a hollow cylindrical support or a solid cylindrical support may be used as the support 72. The mold base 10a (FIG. 3(c)), in which the support 72 is a hollow cylindrical support, has a lighter weight than a mold base which is formed with a solid cylindrical support and therefore has the advantage of better handleability. Also, as described above, using a hollow cylindrical support has the advantage of reducing accumulation of heat in the transfer step.

The hollow cylindrical support may be a cylindrical metal pipe or a metal sleeve. The metal sleeve advantageously has a lighter weight than the metal pipe. On the other hand, the cylindrical metal pipe has higher rigidity than a flexible metal sleeve, for example. Therefore, when the hollow cylindrical support is a metal pipe, it cannot be bent like the mold 100b (FIG. 4(f)) that is manufactured using the flexible metal sleeve 72m. Thus, it has the advantage of better handleability as compared with the mold 100b that is manufactured using the metal sleeve 72m.

The porous alumina layer 14 of the molds 100a, 100b and 100c in the form of a roll which are obtained according to the manufacturing method of the embodiment of the present invention is formed by anodizing the surface of the aluminum film 18 formed on the tubular resin film 76 as described above and therefore has no seam. Thus, the surfaces of the molds 100a, 100b and 100c have no seam as in the mold 100 (FIG. 1(d)).

Since the mold 100a has the tubular resin film 76 extending between the support 72 and the aluminum film 18, the support 72 and the aluminum film 18 are insulated from each other. Therefore, occurrence of a local cell reaction that may occur between a metal of a different type from aluminum which is contained in the support 72 and the aluminum film 18 during etching can be prevented as in the mold 100 (FIG. 1(d)). Thus, a support which has a desired purity can be used as the support 72, and therefore, there is an advantage that a mold of a desired strength can be manufactured. Likewise, the molds 100b and 100c have the tubular resin films 76 and 26, respectively, between the metal sleeve 72m and the aluminum film 18, and therefore, the metal sleeve 72m and the aluminum film 18 are insulated from each other. Thus, occurrence of a local cell reaction that may occur between a metal of a different type which is contained in the metal sleeve 72m and the aluminum film 18 can advantageously be prevented.

The adhesion between the tubular resin film 76 and the aluminum film 18 can be improved by performing plasma ashing on the surface of the tubular resin film 76, forming an inorganic underlayer, and/or forming a buffer layer, as in the mold manufacturing method which has previously been described with reference to FIG. 1 and which includes the step of forming the insulating layer 16 on the outer perimeter surface of the support 12.

Next, inventive examples and comparative examples are illustrated for describing the mold manufacturing method of the embodiment of the present invention in more detail.

INVENTIVE EXAMPLES 1 to 5

In Inventive Examples 1 to 5, an organic insulating layer was formed as the insulating layer by means of electrodeposition. In Inventive Examples 1 to 5, as will be described below, five mold bases 10 (FIG. 1(c)) and molds 100 (FIG. 1(d)), which had organic insulating layers of different thicknesses and/or different electrodeposition resin types, were prepared by means of electrodeposition according to the method which has previously been described with reference to FIG. 1. Note that, in Inventive Examples 1 to 5, for the sake of simplicity, a stainless steel substrate was used instead of the support 12.

In Inventive Examples 1 to 5, firstly, a mold base was prepared using the stainless steel substrate.

Next, the insulation between the aluminum film and the support in the obtained mold base was examined. The presence/absence of electric conduction between the surface of the aluminum film and the rear surface of the stainless steel substrate in the mold base was examined. Even in the presence of electric conduction, it was determined that the insulation was sufficient so long as the resistance value of the organic insulating layer was not less than $5.0 \times 10^5 \Omega$.

As described above, if the insulation of the organic insulating layer is insufficient, an electric current can flow through the support in the process of anodization. In this case, an excessive electric current can flow, and therefore, it is not preferred from the viewpoint of safety. Also, if the insulation of the organic insulating layer is insufficient, a local cell reaction occurs between the support and the aluminum film in etching of the moth-eye mold manufacturing process in which anodization and etching are repeated, so that recesses with a diameter of about 1 μm can be formed in the aluminum film.

The voltage tolerance of the organic insulating layer of the mold base was examined as described below.

One end of a lead that is connected to the low-voltage side terminal of a voltage tolerance tester was brought into contact with the rear surface of the stainless steel substrate, while one end of a lead that is connected to the high-voltage side terminal was brought into contact with the surface of the aluminum film on the substrate. Note that, in formation of the organic insulating layer on the stainless steel substrate, the organic insulating layer was formed on both sides of the substrate. The organic insulating layer formed on the rear surface of the substrate was partially peeled off for allowing the one end of the aforementioned lead to be in contact.

The applied voltage was gradually increased from 0 V, and the magnitude of a flowing electric current was examined. When an electric current flow was detected before the applied voltage reached 200 V, it was determined that the voltage tolerance was insufficient.

When the voltage tolerance of the organic insulating layer is low, a dielectric breakdown can occur in the organic insulating layer at the anodization step. In this case, for example, the organic insulating layer can be burnt off, so that electric conduction can occur between the support (in this case, the stainless steel substrate) and the aluminum film. If electric conduction occurs between the stainless steel substrate and the aluminum film, a local cell reaction can disadvantageously occur in the etching step.

Also, moth-eye molds were manufactured by performing anodization and etching according to the methods that are disclosed in Patent Documents 3 and 4 identified above, with the use of the mold bases that were prepared according to the methods of Inventive Examples 1 to 5. The moth-eye molds were manufactured by alternately performing the anodization step and the etching step through 5 cycles (including 5 anodization cycles and 4 etching cycles). The anodization step was performed with an applied voltage of 80 V for 37 seconds using an oxalic acid aqueous solution (concentration: 0.3 wt %, solution temperature: 18° C.). The etching step was performed for 29 minutes using a phosphoric acid aqueous solution (concentration: 1 mol/l, solution temperature: 30° C.).

Hereinafter, the method of preparing the mold bases of Inventive Examples 1 to 5 is described.

In Inventive Examples 1 to 5, firstly, a stainless steel substrate (5 cm×10 cm) was provided.

Then, an organic insulating layer was formed on a surface of the substrate by means of electrodeposition. In Inventive Example 1, a 15 μm thick organic insulating layer was formed using a polyimide resin as the electrodeposition resin. In Inventive Example 2, a 15 μm thick organic insulating layer was formed using an acrylic epoxy resin. In Inventive Example 3, a 30 μm thick organic insulating layer was formed using an acrylic epoxy resin. In Inventive Example 4, a 15 μm thick organic insulating layer was formed using an acrylic melamine resin. In Inventive Example 5, a 15 μm thick organic insulating layer was formed using an acrylic urethane resin.

Then, plasma asking was performed on the surface of the organic insulating layer.

Then, a 100 nm thick $SiO_2$ layer was formed as the inorganic underlayer on the surface of the organic insulating layer. The $SiO_2$ layer was formed by sputtering.

Then, a 400 nm thick buffer layer was formed on the $SiO_2$ layer. The buffer layer was realized by a plurality of aluminum oxide layers with different oxygen contents which were formed by sputtering. First, a 200 nm thick AlO layer was formed. The plurality of aluminum oxide layers were formed on the AlO layer by sputtering so as to have such a profile that one of the aluminum oxide layers which is closer to the AlO layer has a higher oxygen content, i.e., so as to have such a profile that the aluminum content is higher on the aluminum film side than on the AlO layer side.

Then, an aluminum film was deposited to 1 μm thick by sputtering on the surface of the buffer layer. In this way, the mold base was prepared.

The mold bases of Inventive Examples 1 to 5 were examined as to the presence/absence of electric conduction between the stainless steel substrate and the aluminum film using a tester. In Inventive Examples 1 to 5, no electric conduction was detected. It was found that, in Inventive Examples 1 to 5, the organic insulating layer provides sufficient insulation.

Also, the mold bases of Inventive Examples 1 to 5 were examined as to the voltage tolerance of the organic insulating layer. In Inventive Examples 1 to 5, no electric current flow was detected in the organic insulating layer even when the voltage was increased to 200 V. That is, in the mold bases of Inventive Examples 1 to 5, the organic insulating layer had sufficient voltage tolerance.

FIGS. 7(a) to 7(e) are SEM images of the surfaces of moth-eye molds which were manufactured using the mold bases of Inventive Examples 1 to 5. FIGS. 7(a) to 7(e) show SEM images of the surfaces of moth-eye molds which were manufactured using the mold bases that were prepared in Inventive Examples 1 to 5.

As seen from FIGS. 7(a) to 7(e), in each of the moth-eye molds, a plurality of minute recessed portions were generally uniformly formed across the entire surface. The two-dimensional size of the plurality of minute recessed portions viewed in a direction normal to the surface was about 180 nm. In each of Inventive Examples 1 to 5, repetition of the anodization step and the etching step did not lead to occurrence of electric conduction in the organic insulating layer, and no local cell reaction occurred in the aluminum film. By performing the anodization step and the etching step, a desired uneven structure was successfully formed.

Next, the evaluation results for the adhesion of the mold bases of Inventive Examples 1 to 5 and the moth-eye molds that were manufactured using the mold bases of Inventive Examples 1 to 5.

In a moth-eye mold, if the adhesion of the aluminum film 18 (or the porous alumina layer 14 when the aluminum film is entirely anodized) is low, the step of separating a work from the moth-eye mold in production of an antireflection film with the use of the moth-eye mold can fail so that the aluminum film and the porous alumina layer lying on the aluminum film can be peeled off together with the work. The adhesion of the aluminum film of the mold bases of Inventive Examples 1 to 5 was evaluated as described below according to the same peeling test as that described above.

The aluminum film formed on the organic insulating layer was cut into a matrix of 5×5 squares, each having a size of 1 cm×1 cm, using a utility knife. An adhesive tape was tightly placed onto the aluminum film so as to cover a region of the cut squares and then peeled off from the aluminum film. The number of squares which were removed together with the peeled adhesive tape was counted for evaluation of the adhesion of the aluminum film. When the number of removed squares was not more than five, it was determined that the adhesion was sufficient.

The peeling test results of the mold bases of Inventive Examples 1 to 5 (the number of removed squares of the aluminum film) are shown in Table 2. Further, the same peeling test as that described above was carried out on the moth-eye molds that were manufactured using the mold bases of Inventive Examples 1 to 5. In Table 2, the numbers of squares removed from the moth-eye molds are shown together.

TABLE 2

|  | Inventive Example | | | | |
| --- | --- | --- | --- | --- | --- |
|  | 1 | 2 | 3 | 4 | 5 |
| Number of squares removed from mold base | 0 | 0 | 3 | 0 | 5 |
| Number of squares removed from moth-eye mold | 3 | 4 | 6 | 2 | 8 |

As seen from Table 2, in each of Inventive Examples 1 to 5, the number of squares removed from the mold base of the aluminum film was not more than five, which means that the mold base had sufficient adhesion. Particularly, in the mold bases of Inventive Example 1 (the organic insulating layer is a 15 μm thick polyimide layer), Inventive Example 2 (the organic insulating layer is a 15 μm thick acrylic epoxy layer), and Inventive Example 4 (the organic insulating layer is a 15 μm thick acrylic melamine layer), the number of removed squares of the aluminum film was zero (0), which means that the aluminum film had high adhesion.

As seen from Table 2, among the moth-eye molds which were manufactured using the mold bases, the number of removed squares of the aluminum film was smallest in the moth-eye mold which was manufactured using the mold base of Inventive Example 4. Note that, in each of Inventive Examples 1 to 5, the number of squares removed from the moth-eye mold was larger than the number of squares removed from the mold base. For example, it is inferred that, in the etching step, the buffer layer lying between the aluminum film and the inorganic underlayer was partially dissolved by the phosphoric acid aqueous solution, and this is one of the causes of the deterioration of the adhesion of the aluminum film.

As seen from Table 2, in the moth-eye molds which were manufactured using the mold bases of Inventive Examples 3 and 5, the number of removed squares of the aluminum film was more than five. Note that, as described above with the experimental results, the adhesion of the aluminum film can be improved by, for example, modifying the film formation conditions for the buffer layer. For example, the adhesion is improved by increasing the thickness of the buffer layer.

In the mold bases of Inventive Examples 1 to 5, the specularity of the surface of the aluminum film was examined with a human eye. The surface of the aluminum film of the mold base of Inventive Example 4 had the highest specularity.

INVENTIVE EXAMPLE 6

In Inventive Example 6, on the surface of the stainless steel substrate which was the same as those of Inventive Examples 1 to 5, an organic insulating layer was formed according to a spray coating method with the use of an UreTop product manufactured by Nippon Paint Co., Ltd.

The presence/absence of electric conduction between the stainless steel substrate and the aluminum film was examined using a tester in the same way as in Inventive Examples 1 to 5, and no electric conduction was detected. This means that the insulation was sufficient. Further, the voltage tolerance was also examined in the same way as in Inventive Examples 1 to 5. No electric current flow was detected even when the voltage was increased to 200 V. This means that the voltage tolerance was sufficient.

Figure 7:
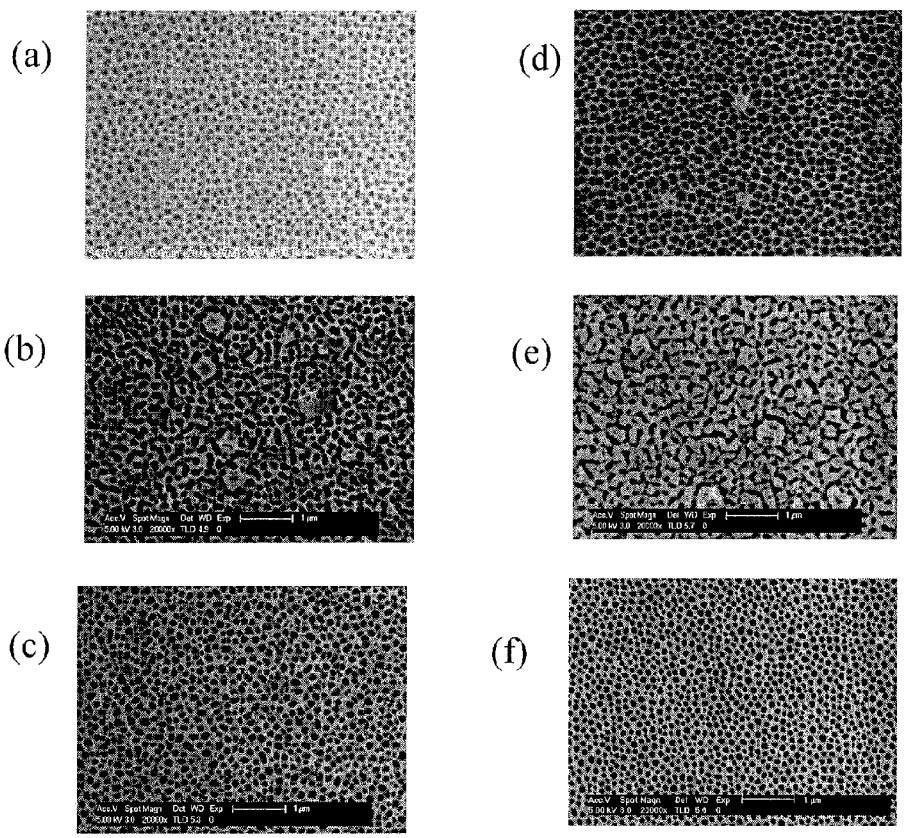
[FIG. 7] (a) to (f) are SEM images of the surfaces of moth-eye molds of Inventive Examples 1 to 6.

A moth-eye mold was manufactured using the mold base of Inventive Example 6 by alternately performing the anodization step and the etching step through 5 cycles (including 5 anodization cycles and 4 etching cycles) under the same conditions as those of Inventive Examples 1 to 5. FIG. 7(f) is a SEM image of the surface of the moth-eye mold of Inventive Example 6. As seen from FIG. 7(f), a plurality of minute recessed portions were formed generally uniformly across the entire surface as in Inventive Examples 1 to 5 (FIGS. 7(a) to 7(e)).

In the mold base of Inventive Example 6, the adhesion of the aluminum film was relatively low. Note that, as described above, the adhesion can be improved by performing plasma ashing on the surface of the organic insulating layer and/or providing an inorganic underlayer or a buffer layer.

Comparing Inventive Examples 1 to 5 in which the organic insulating layer was formed by electrodeposition and Inventive Example 6 in which the organic insulating layer was formed by spray painting, the adhesion of the aluminum film was higher in Inventive Examples 1 to 5. On the other hand, the specularity of the surface of the aluminum film was higher in Inventive Example 6 than in Inventive Examples 1 to 5.

A mold base was prepared in which an organic insulating layer was formed by imidizing a polyamic acid that was applied on a surface of a stainless steel substrate according to a dip coating method. The insulation between the substrate and the aluminum film, the voltage tolerance, and the adhesion of the aluminum film were examined. The insulation and the voltage tolerance were sufficiently achieved, whereas the adhesion was insufficient. Note that, as described above, the adhesion of the aluminum film can be improved by, for example, performing plasma ashing on a surface of an insulating layer and thereafter providing a $SiO_2$ layer and a buffer layer. Comparing Inventive Examples 1 to 5, Inventive Example 6, and a mold base which had a layer that was formed by curing a polyamic acid, the adhesion of the aluminum film was higher in order of "Inventive Examples 1 to 5">"Inventive Example 6">"the mold base which had the cured polyamic acid layer".

INVENTIVE EXAMPLES 7 and 8

In Inventive Examples 7 and 8, mold bases and moth-eye molds were manufactured as described below according to the same method as that of Inventive Examples 1 to 5 except that a metal pipe was used.

Firstly, a metal pipe was provided. In Inventive Example 7, a pipe which was made of stainless steel (diameter: 150 mm, length: 500 mm) was provided. Inventive Example 8, a pipe which was made of nickel (Ni) (diameter: 140 mm, length: 540 mm) was provided.

In Inventive Examples 7 and 8, a 15 μm thick acrylic melamine layer was formed as the organic insulating layer by means of electrodeposition.

Then, plasma ashing was performed on the surface of the organic insulating layer as in Inventive Examples 1 to 5.

Then, a 100 nm thick $SiO_2$ layer was formed as the inorganic underlayer on the surface of the organic insulating layer. The $SiO_2$ layer was formed by sputtering.

Then, a 400 nm thick buffer layer was formed on the $SiO_2$ layer. The buffer layer was realized by a plurality of aluminum oxide layers with different oxygen contents, which were formed by sputtering. First, a 200 nm thick AlO layer was formed. Then, a plurality of aluminum oxide layers were formed on the AlO layer by sputtering so as to have such a profile that one of the aluminum oxide layers which is closer to the AlO layer has a higher oxygen content.

Then, an aluminum film was deposited to 1 μm thick by sputtering on the surface of the buffer layer. In this way, a mold base (the mold base 10 shown in FIG. 1(c)) was prepared.

The organic insulating layers of the mold bases of Inventive Examples 7 and 8 were examined as to the insulation and the voltage tolerance. The both layers had sufficient insulation and sufficient voltage tolerance. Further, the peeling test was carried out on the aluminum film. The number of removed squares was not more than five, which means that the adhesion was sufficient.

Anodization and etching were alternately performed through 5 cycles using the mold bases of Inventive Examples 7 and 8 in the same way as for the mold bases of Inventive Examples 1 to 5. As a result, a moth-eye mold in the form of a roll was obtained in which an inverted moth-eye structure was formed uniformly across the outer perimeter surface.

COMPARATIVE EXAMPLES 1 to 6

In Comparative Examples 1 to 6, an inorganic insulating layer was formed as described below.

In Comparative Examples 1 to 4, firstly, a pipe with a diameter of 150 mm and a length of 400 mm, which was made of stainless steel, was provided.

Then, an inorganic insulating layer was formed by sputtering on the outer perimeter surface of the stainless steel pipe. In Comparative Example 1, a 100 nm thick $SiO_2$ layer was formed on the outer perimeter surface of the stainless steel pipe. In Comparative Example 2, a 300 nm thick $Ta_2O_5$ layer was formed. In Comparative Example 3, a 500 nm thick $Ta_2O_5$ layer was formed. In Comparative Example 4, a 1 μm thick $Ta_2O_5$ layer was formed. Thereafter, an aluminum film was formed as in Inventive Examples 1 to 5.

In Comparative Examples 5 and 6, firstly, a square stainless steel plate of 10 cm on each side was provided.

Then, in Comparative Example 5, a 300 nm thick $Ta_2O_5$ layer was formed. In Comparative Example 6, a 500 nm thick $Ta_2O_5$ layer was formed. Thereafter, an aluminum film was formed.

The insulation of the inorganic insulating layer and the adhesion of the aluminum film of Comparative Examples 1 to 6 were examined in the same way as in Inventive Examples 1 to 5. The results are shown in Table 3.

TABLE 3

| Comparative Example | 1 | 2 | 3 | 4 | 5 | 6 |
|---|---|---|---|---|---|---|
| Resistance Value (Ω) of inorganic insulating layer | 0.5 | 0.5 | 30-50 | 1000 | — | — |
| Number of removed squares | 0 | 0 | 0 | 0 | 0 | 0 |

As seen from Table 3, in each of Comparative Examples 1 to 6, the number of removed squares was zero (0), which means that the adhesion of the aluminum film was excellent.

As for the insulation, no electric conduction was detected in Comparative Examples 5 and 6. On the other hand, in Comparative Examples 1 to 4, electric conduction was detected between the stainless steel pipe and the aluminum film. As seen from the comparison of Comparative Examples 1, 2, 3, and 4, the resistance value of the inorganic insulating layer was higher as the thickness of the inorganic insulating layer increases.

Comparative Examples 4 to 6 were examined as to the voltage tolerance. Samples were immersed in an oxalic acid aqueous solution (0.3 wt %, solution temperature: 18° C.), and the applied voltage was gradually increased from 0 V.

In Comparative Example 4, when 80 V was applied, an electric current flow of 100 A was detected. In Inventive Examples 1 to 8, when anodization was performed with an applied voltage of 80 V, the electric current value was about 20 A. That is, the electric current flowing in the mold base of Comparative Example 4 was larger than usual, so that the voltage tolerance was insufficient.

In Comparative Example 5, when the applied voltage was 60 V, an electric current flow of 3 A was detected. According to the researches conducted by the present inventor, when anodization was performed with an applied voltage of 60 V using a mold base which is the same as the mold bases of Inventive Examples 1 to 8, the electric current value was about 0.3 A. That is, the electric current flowing in Comparative Example 5 was larger than usual.

On the other hand, in Comparative Example 6, even when the voltage was increased to 100 V, a large electric current flow was not detected, which means that the voltage tolerance was sufficient.

It is inferred that the insufficient insulation in Comparative Examples 1 to 4 is attributed to relatively low step coverage of the inorganic insulating layer. Since the step coverage of the inorganic insulating layer is low, for example, electric conduction became more likely to occur between the support and the aluminum film via dirt or a foreign substance which is present on the outer perimeter surface of the support before formation of the inorganic insulating layer (e.g., a remainder of abrasive particles used for processing the surface of the support). Comparative Examples 1 to 4 in which the pipe was used had a larger surface area than Comparative Examples 5 and 6 in which the stainless steel plate was used, and it is therefore inferred that Comparative Examples 1 to 4 had more dirt and foreign substances, so that electric conduction was more likely to occur.

Comparing Comparative Examples 2 to 4 which used the same material for the inorganic insulating layer and the same support, the resistance value of the inorganic insulating layer increased as the thickness of the inorganic insulating layer increased. This is probably because the step coverage was improved by increasing the thickness of the inorganic insulating layer.

Note that, even without increasing the thickness of the inorganic insulating layer, the probability of electric conduction between the aluminum film formed on the inorganic insulating layer and the support can be reduced by, for example, washing the surface of the support such that the foreign substances are removed from the surface of the support before formation of the inorganic insulating layer. Alternatively, for example, the support used may be a support which has undergone surface processing without the use of abrasive particles. In this case, there are no remaining abrasive particles on the surface of the support. Therefore, the probability of electric conduction between the aluminum film formed on the inorganic insulating layer and the support can be reduced.

The organic insulating layer has better step coverage than the inorganic insulating layer. Therefore, in a mold base in which the organic insulating layer and the aluminum film are formed on the support, the probability of electric conduction between the support and the aluminum film is low as compared with a mold base in which the inorganic insulating layer is formed. Thus, when the organic insulating layer is formed, the probability of electric conduction between the support and the aluminum film is low even without performing the above-described washing step. Also, for example, when the organic insulating layer and the aluminum film are formed on the support with the use of a support that has undergone a process which is different from the process in which no abrasive particles are used, the probability of electric conduction between the support and the aluminum film is low.

It was also found that, in the film formation step of the aluminum film, electric conduction is likely to occur between the support and the aluminum film via aluminum ions caught up in the inorganic insulating layer. In Comparative Examples 1 to 4, the thickness of the inorganic insulating layer was relatively small, and it is therefore inferred that electric conduction was likely to occur via aluminum ions contained in the inorganic insulating layer. For example, by reducing the sputtering power in the film formation step for the aluminum film, entry of aluminum ions into the inorganic insulating layer can be prevented.

Figure 8:
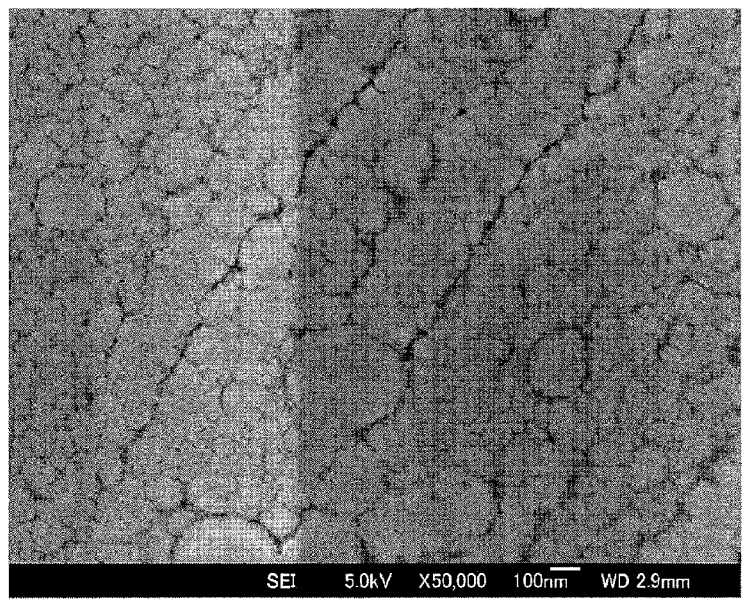
[FIG. 8] A SEM image of the surface of a $Ta_2O_5$ layer of Comparative Example 2.

In Comparative Examples 2 to 4, it is inferred that, there were Ta particles with a diameter of about several hundreds of nanometers on the surface of the $Ta_2O_5$ layer, and electric conduction occurred via these Ta particles. FIG. 8 is a SEM image of the surface of the $Ta_2O_5$ layer of Comparative Example 2 (inorganic insulating layer: the surface of the 300 nm thick $Ta_2O_5$ layer). As seen from FIG. 8, on the surface of the $Ta_2O_5$ layer of Comparative Example 2, there were particles with a diameter of about several hundreds of nanometers. An element analysis was carried out according to the energy dispersed X-ray analysis (EDS), and it was found that the particles with a diameter of about several hundreds of nanometers were Ta particles. Although it is difficult to discern in FIG. 8, in the surface of the $Ta_2O_5$ layer of Comparative Example 2, the areas other than the Ta particle portions were occupied by particles with a diameter of about several tens of nanometers. The particles with a diameter of about several tens of nanometers were crystal grains of $Ta_2O_5$. In Comparative Example 2, it is inferred that, in the Ta particle portions, electric conduction occurred between the aluminum film and the support. Note that Ta particles such as described above were produced through such a process that part of a Ta plate which was used as a target in the film formation (sputtering) step partially melted, and Ta that melted was scattered to adhere to the surface of a component on which deposition is intended (i.e., the surface of the stainless steel pipe), which is called "splash". Occurrence of the Ta particles such as described above can be prevented by increasing the amount of oxygen introduced in the film formation step for the $Ta_2O_5$ layer such that Ta is sufficiently oxidized. Further, local melting of the Ta plate can be prevented by reducing the sputtering power in the film formation step.

As seen from FIG. 8, there is a stripe pattern across the surface of the $Ta_2O_5$ layer of Comparative Example 2. Observing the surface of the stainless steel pipe, there was a stripe pattern which is similar to that seen in the surface of the $Ta_2O_5$ layer. In Comparative Example 2, an uneven shape which corresponds to the unevenness of the surface of the stainless steel pipe was formed in the surface of the $Ta_2O_5$ layer. Thus, since in Comparative Example 2 the uneven shape was formed in the surface of the $Ta_2O_5$ layer due to the effects of the surface state of the stainless steel pipe, the specularity of the surface of the aluminum film formed on the $Ta_2O_5$ layer was low. In the other comparative examples, the specularity of the surface of the aluminum film formed on the inorganic insulating layer was also low. Note that the surface of the inorganic insulating layer can be a flat surface when a support of high specularity is used as the support. Alternatively, when using a support that has undergone a surface treatment in which no abrasive particles are used, such as bit cutting, no abrasive particles are present on the surface of the support, and therefore, a flat inorganic insulating layer is relatively easily obtained.

Figure 9:
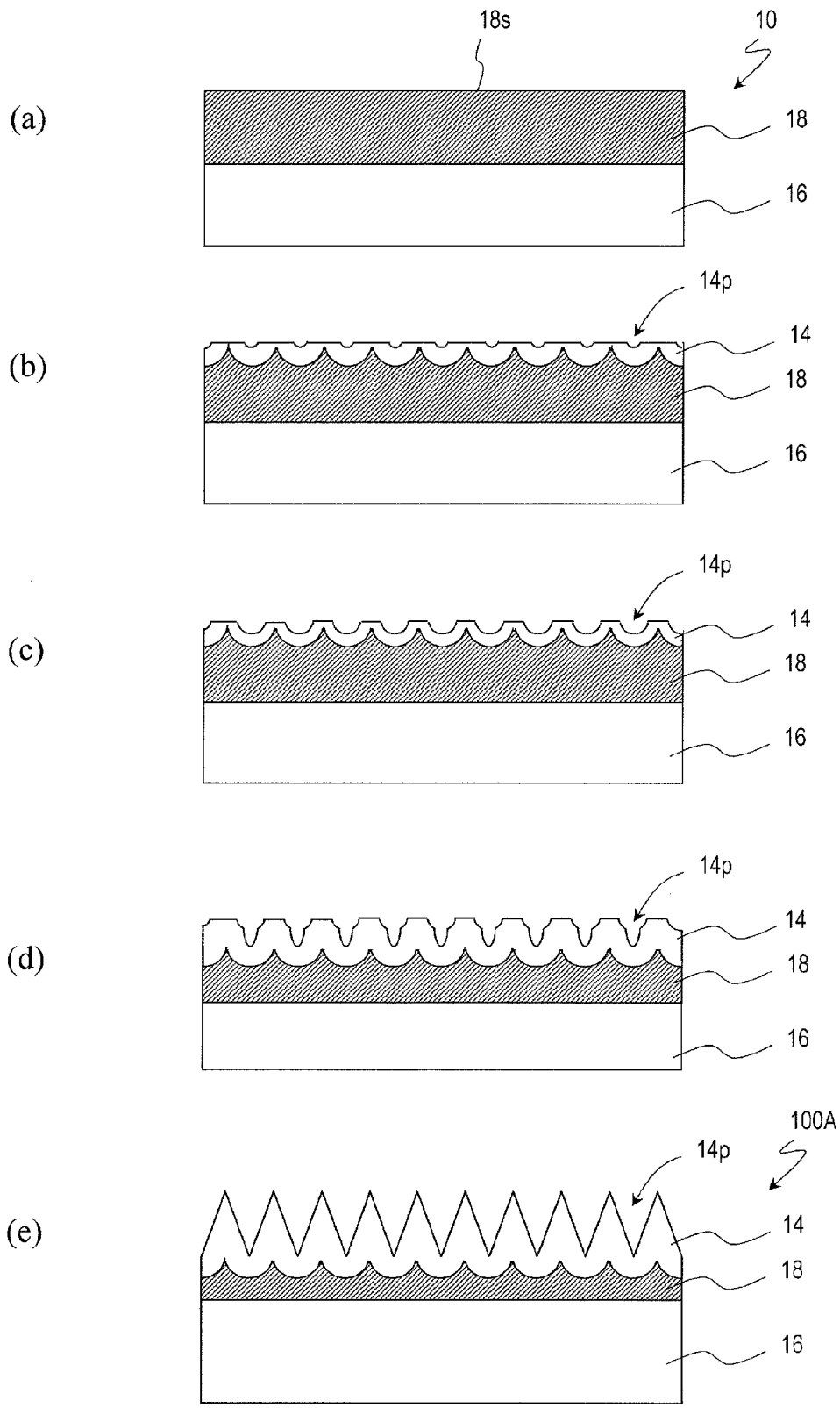
[FIG. 9] (a) to (e) are diagrams for illustrating a mold manufacturing method for a moth-eye mold 100A of an embodiment of the present invention.

A mold manufacturing method of an embodiment of the present invention can be used for manufacture of a moth-eye mold in the form of a roll. The process of manufacturing a moth-eye mold in the form of a roll is described with reference to FIG. 9. FIGS. 9(*a*) to 9(*e*) are schematic cross-sectional views for illustrating a method for manufacturing a moth-eye mold in the form of a roll according to an embodiment of the present invention, which are viewed in a direction perpendicular to the axial direction. Note that FIG. 9 only shows part of the insulating layer 16 and part of the aluminum film 18 for the sake of simplicity.

First, a mold base 10 is provided as shown in FIG. 9(*a*). The mold base 10 is manufactured through the process that has previously been described with reference to FIGS. 1(*a*) to 1(*c*) and includes a support 12 (not shown), an insulating layer 16, and an aluminum film 18 deposited on the insulating layer 16.

Then, a surface of the base 10 (a surface 18s of the aluminum film 18) is anodized to form a porous alumina layer 14 which has a plurality of micropores 14p (minute recessed portions) as shown in FIG. 9(*b*). The porous alumina layer 14 includes a porous layer which has the micropores 14p and a barrier layer. The porous alumina layer 14 may be formed by, for example, anodizing the surface 18s in an acidic electrolytic solution. The electrolytic solution used in the step of forming the porous alumina layer 14 may be, for example, an aqueous solution which contains an acid selected from the group consisting of oxalic acid, tartaric acid, phosphoric acid, chromic acid, citric acid, and malic acid. For example, the surface 18s of the aluminum film 18 is anodized for 37 seconds using an oxalic acid aqueous solution (concentration: 0.3 wt %, solution temperature: 18° C.) with an applied voltage of 80 V, whereby the porous alumina layer 14 is formed.

By modifying the anodization conditions (e.g., the type of the electrolytic solution, the applied voltage), the interpore distance, the depth of the micropores, the shape of the micropores, etc., can be adjusted. Note that the thickness of the porous alumina layer may be changed when necessary. The aluminum film 18 may be entirely anodized.

Then, the porous alumina layer 14 is brought into contact with an alumina etchant such that a predetermined amount is etched away, whereby the pore diameter of the micropores 14p is increased as shown in FIG. 9(c). Here, wet etching may be employed such that the pore wall and the barrier layer can be generally isotropically etched. By modifying the type and concentration of the etching solution and the etching duration, the etching amount (i.e., the size and depth of the micropores 14p) can be controlled. The etching solution used may be, for example, an aqueous solution of 10 mass % phosphoric acid or organic acid, such as formic acid, acetic acid, citric acid, or the like, or a chromium-phosphoric acid mixture solution. For example, the etching is performed for 29 minutes using phosphoric acid (1 mol/L, 30° C.), whereby the micropores 14p are enlarged.

Then, the aluminum film 18 is again partially anodized such that the micropores 14p are grown in the depth direction and the thickness of the porous alumina layer 14 is increased as shown in FIG. 9(d). Here, the growth of the micropores 14p starts at the bottoms of the previously-formed micropores 14p, and accordingly, the lateral surfaces of the micropores 14p have stepped shapes.

Thereafter, when necessary, the porous alumina layer 14 may be brought into contact with an alumina etchant to be etched such that the pore diameter of the micropores 14p is further increased. The etching solution used in this step may preferably be the above-described etching solution. Practically, the same etching bath may be used.

In this way, by repeating the anodization step and the etching step as described above, the moth-eye mold 100A that includes the porous alumina layer 14 which has a desired uneven shape is obtained as shown in FIG. 9(e).

Figure 10:
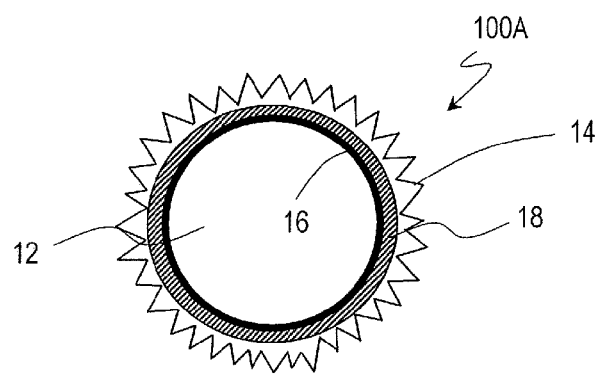
[FIG. 10] A schematic cross-sectional view of a moth-eye mold 100A.

FIG. 10 is a schematic cross-sectional view of a moth-eye mold 100A which is seen in an axial direction. As shown in FIG. 10, the moth-eye mold 100A includes the support 12, the insulating layer 16, the aluminum film 18 and the porous alumina layer 14. Note that, in the case shown in FIG. 10, the aluminum film 18 is not entirely converted into alumina. However, the aluminum film 18 may be entirely converted into alumina.

Figure 11:
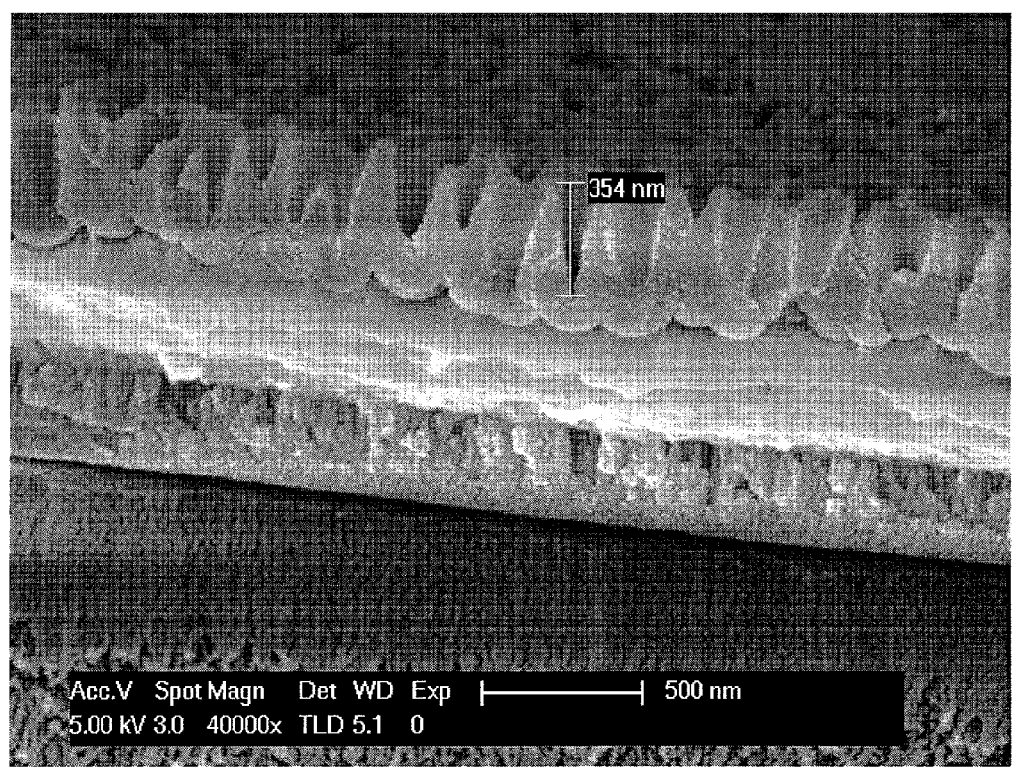
[FIG. 11] A cross-sectional SEM image of a porous alumina layer of the moth-eye mold 100A that is in the form of a roll.

FIG. 11 is a cross-sectional SEM image of the moth-eye mold 100A that is in the form of a roll. As seen from FIG. 11, in the surface of the moth-eye mold 100A, a plurality of micropores were formed with the interpore distance of about 180 nm. Note that the moth-eye mold 100A shown in FIG. 11 was manufactured alternately performing the anodization step and the etching step through 5 cycles (including 5 anodization cycles and 4 etching cycles). The anodization step was performed with an applied voltage of 80 V for 37 seconds using an oxalic acid aqueous solution (concentration: 0.3 wt %, solution temperature: 18° C.). The etching step was performed for 29 minutes using a phosphoric acid aqueous solution (concentration: 1 mol/l, solution temperature: 30° C.).

To produce an antireflection film with an excellent antireflection function, the two-dimensional size of the micropores 14p viewed in a direction normal to the surface is preferably not less than 10 nm and less than 500 nm (Patent Documents 1, 2 and 4 identified above), and more preferably not less than 50 nm and less than 500 nm. Note that the two-dimensional size can be approximately represented by the diameter of a circle.

According to a moth-eye mold manufacturing method of an embodiment of the present invention, the support 12 and the aluminum film 18 are insulated from each other by the insulating layer 16 as described above. Therefore, when anodization and etching are performed using an aluminum pipe, occurrence of a local cell reaction which may occur in the etching step can advantageously be prevented. Also, when etching is performed using the mold base 10a (FIG. 3(c)), the support 72 and the aluminum film 18 are insulated from each other by the tubular resin film 76 as described above. Therefore, occurrence of a local cell reaction can advantageously be prevented.

Next, an antireflection film production method of an embodiment of the present invention is described. Note that, in a case which will be described below, a mold in the form of a roll is used which is manufactured using a metal pipe of high rigidity and high circularity as the support 12. That is, in the case which will be exemplified below, the mold as manufactured can be used in a roll-to-roll method.

Note that, as described above, the mold 100 which is manufactured using the support 12 can have low rigidity or low circularity. In this case, the mold can be used in a roll-to-roll method with a core member kept inserted inside the support 12. For example, a mold which is manufactured using a flexible metal sleeve as the support 12 can be used in a roll-to-roll method with a core member kept inserted inside the metal sleeve. The case of using a mold which is manufactured using a flexible metal sleeve will be described later. Note that a mold which is manufactured using a support of high circularity or high rigidity, such as a mold which is manufactured using a solid cylindrical aluminum or stainless steel pole, as the support 72 can be used in a roll-to-roll method without making any modification to the mold as manufactured. Note that, for example, a solid cylindrical stainless steel pole can advantageously have higher rigidity or higher circularity than a solid cylindrical aluminum pole. On the other hand, the aluminum material has a lighter weight and therefore has the advantage of relatively better handleability.

Figure 12:
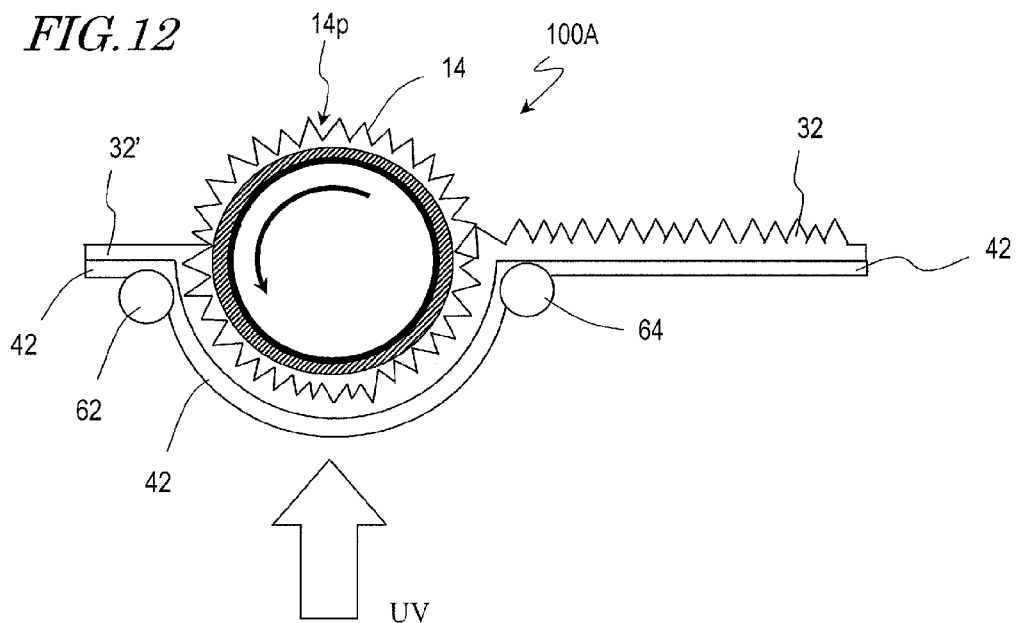
[FIG. 12] A schematic cross-sectional view for illustrating the process of producing an antireflection film using the moth-eye mold 100A.

Hereinafter, an antireflection film production method of an embodiment of the present invention is described with reference to FIG. 12. FIG. 12 is a schematic cross-sectional view for illustrating a method for producing an antireflection film according to a roll-to-roll method.

Firstly, a moth-eye mold 100A in the form of a roll, which is shown in FIG. 10, is provided.

Then, as shown in FIG. 12, a work 42 over which a UV-curable resin 32' is applied on its surface is maintained pressed against the moth-eye mold 100A, and the UV-curable resin 32' is irradiated with ultraviolet (UV) light such that the UV-curable resin 32' is cured. The UV-curable resin 32' used may be, for example, an acrylic resin. The work 42 may be, for example, a TAC (triacetyl cellulose) film. The work 42 is fed from an unshown feeder roller, and thereafter, the UV-curable resin 32' is applied over the surface of the work 42 using, for example, a slit coater or the like. The work 42 is supported by supporting rollers 62 and 64 as shown in FIG. 12. The supporting rollers 62 and 64 have rotation mechanisms for carrying the work 42. The moth-eye mold 100A in the form of a roll is rotated at a rotation speed corresponding to the carrying speed of the work 42 in a direction indicated by the arrow in FIG. 12.

Thereafter, the moth-eye mold 100A is separated from the work 42, whereby a cured material layer 32 to which an uneven structure of the moth-eye mold 100A (inverted moth-eye structure) is transferred is formed on the surface of the work 42. The work 42 which has the cured material layer 32 formed on the surface is wound up by an unshown winding roller.

Next, an example of transfer (e.g., production of an antireflection film) with the use of the mold 100b which is manufactured using the flexible metal sleeve 72m is described.

Figure 13:
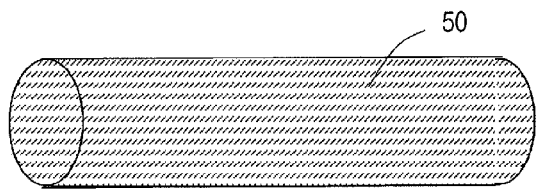
[FIG. 13] (a) to (c) are schematic diagrams for illustrating the process of producing an antireflection film using a mold 100b of an embodiment of the present invention.
Figure 13:
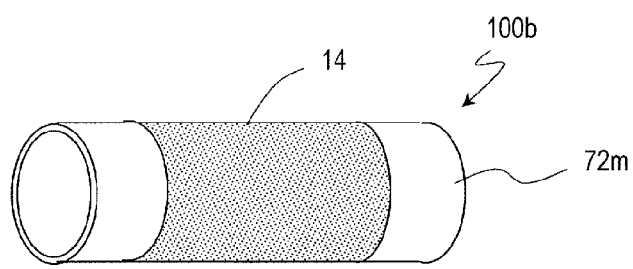
Figure 13:
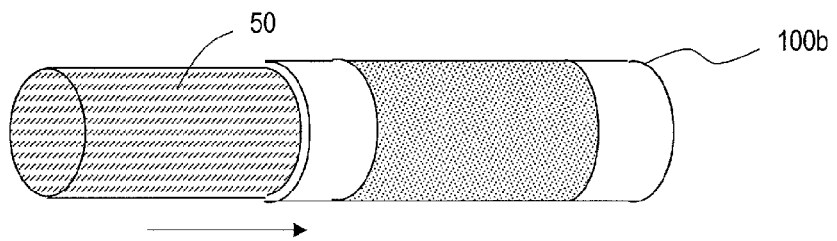

Firstly, the mold 100b that is manufactured using the metal sleeve 72m and a core member 50 that is in the form of a roll are provided as shown in FIG. 13(a). The core member 50 in the form of a roll may be, for example, a solid cylindrical stainless steel pole.

Then, the core member 50 is inserted inside the metal sleeve 72m of the mold 100b as shown in FIG. 13(b). Here, for example, the core member 50 may have an air slide function. For example, the core member 50 may be a hollow core member which has a plurality of small pores penetrating through the outer perimeter surface such that compressed air can be expelled from the hollow portion through the small pores. By expelling the compressed air, the friction of the outer perimeter surface of the core member 50 can be reduced, so that insertion of the core member into the metal sleeve 72m can be easy (see Japanese Laid-Open Patent Publication No. 2004-031804).

Alternatively, for example, insertion of the core member 50 inside the metal sleeve 72m of the mold 100b may be realized by inserting the core member 50 which has been cooled to shrink into the metal sleeve 72m and then restoring the core member 50 to the normal temperature such that it recovers its original size.

Thereafter, an antireflection film can be produced according to the same method as that previously described with reference to FIG. 12.

When the metal sleeve 72m has flexibility, the mold is bent in the process of transfer so that part of the mold cannot be pressed against the surface of a work. As a result, the uneven structure of the surface of the mold may not be transferred in some cases. When the core member 50 is inserted, bending of the mold which may occur in the process of transfer can be prevented.

The above description has been given with the example where the mold 100b is manufactured using the flexible metal sleeve 72m as the support 72. However, an antireflection film can also be produced according to the method that has previously been described with reference to FIG. 12 even in the case of using the mold 100 (FIG. 1) that is manufactured using a flexible metal sleeve as the support 12.

When an antireflection film is produced using the mold 100 that is manufactured using the support 12 that has relatively high rigidity or circularity, such as an aluminum or stainless steel pipe, the mold 100 may be rotated by rotating a rotatable shaft which is inserted and secured in the hollow portion of the support 12.

Figure 14:
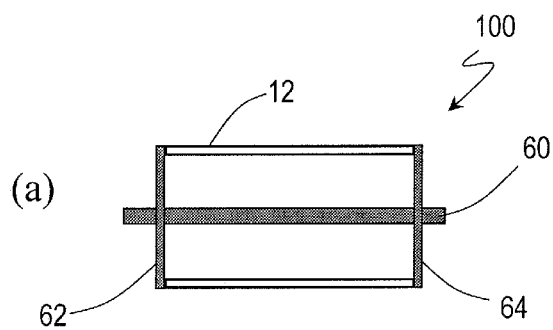
[FIG. 14] (a) to (c) are schematic diagrams for illustrating the process of producing an antireflection film using a mold 100 of an embodiment of the present invention.
Figure 14:
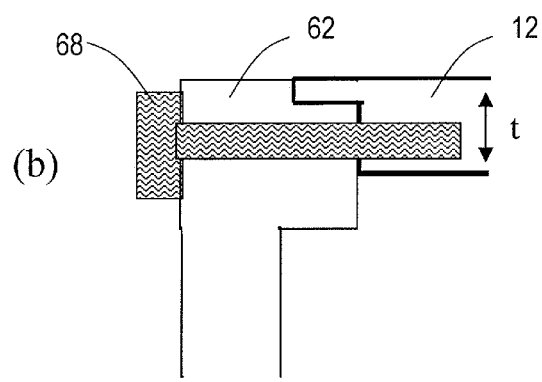
Figure 14:
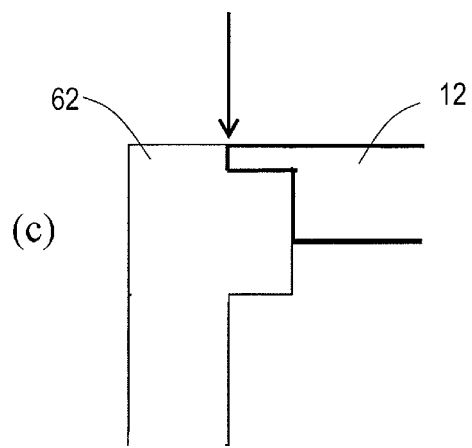

Hereinafter, the method of securing a rotatable shaft in the hollow portion of the support 12 is described with reference to FIG. 14. Note that, of the constituents of the mold 100, only the support 12 is shown in FIG. 14 for the sake of simplicity, and the insulating layer 16 and the porous alumina layer 14 are not shown.

FIG. 14(a) is a schematic diagram illustrating a case where a moth-eye mold 100 in the form of a roll which is manufactured using a metal pipe as the support 12 is used in production of an antireflection film. As shown in FIG. 14(a), a rotatable shaft 60 is secured to the opposite ends of the support 12 with flange members 62 and 64. Each of the flange members 62 and 64 has the shape of a circular disc whose outside diameter is generally equal to the outside diameter of the support 12. The flange members 62 and 64 have holes at their centers, through which the rotatable shaft 60 is to be inserted. For example, the rotatable shaft 60 and the flange member 62 may be integrally formed. For example, the rotatable shaft 60 may be secured to the support 12 by fixing the flange member 62 to one end of the support 12 and thereafter fixing the flange member 64 to the other end of the support 12 such that the rotatable shaft 60 is inserted through the hole at the center of the flange member 64.

The flange member 62 and the support 12 may be secured together with a bolt or by welding, for example. An example of securing the flange member 62 and the support 12 together with a bolt is described with reference to FIG. 14(b). FIG. 14(b) is a schematic cross-sectional view for illustrating the example of securing the flange member 62 and the support 12 together with a bolt. As shown in FIG. 14(b), the support 12 and the flange member 62 are secured together by tightening a bolt 68 into a bolt hole which is formed at an end of the support 12 so as to extend parallel to the axial direction. Note that the end of the support 12 and the end of the flange member 62 may have a male-female configuration such that they fit into each other as shown in FIG. 14(b). With the male-female configuration, positioning of the flange member 62 relative to the support 12 can readily be realized. On the other hand, when the flange member 62 and the support 12 are secured together by welding, for example, as shown in FIG. 14(c), the support 12 and the flange member 62 are fitted into each other, and thereafter, a joint portion which is indicated by the arrow in FIG. 14(c) is welded. The flange member 64 can also be secured with a bolt or by welding, for example, as the flange member 62 can be.

In the case where the securing is realized with a bolt, when the support 12 used is, for example, a stainless steel pipe with a diameter of 150 mm and a length of 400 mm, the thickness of the stainless steel piped, t (shown in FIG. 14(b)), is preferably not less than 20 mm. On the other hand, in the case where the securing is realized by welding, the thickness of the support 12 may be not less than 6 mm.

When the center of the rotatable shaft 60 is misaligned relative to the center of the support 12, the outer perimeter surface of the rotatable shaft 60 may be, for example, plated such that the thickness of the rotatable shaft 60 is increased, and thereafter, the plated portion may be partially ground such that the center of the rotatable shaft 60 is aligned with the center of the support 12. According to this method, when a pipe with a thickness of 20 mm is used, for example, the center of the rotatable shaft 60 and the center of the support 12 can be aligned with each other with an accuracy of 40 μm. Note that, when the support 12 has a diameter of 150 mm, for example, a shaft with a diameter of about 75 mm may be used as the rotatable shaft 60.

The mold 100 that is manufactured using a cylindrical metal pipe as the support 12 has high rigidity and high circularity and therefore has the advantage of omitting the step of inserting the core member 50 (FIG. 13), whereas this step is necessary for the mold 100b that is manufactured using the metal sleeve 72m.

By repetition of transfer with the use of the mold 100 of an embodiment of the present invention, the porous alumina layer 14 may wear out. The mold 100 of an embodiment of the present invention (FIG. 1(d)) is easily reworkable as will be described below when the insulating layer 16 is, for example, an organic insulating layer. For example, the mold 100 is immersed in a sodium hydroxide aqueous solution (e.g., concentration: 20%, solution temperature: 25° C.) for 60 seconds such that the porous alumina layer 14 is dissolved away, and thereafter, the step of forming an aluminum film and the anodization step are performed according to the same method as that previously described with reference to FIG. 1, whereby reworking is realized. Note that the sodium hydroxide aqueous solution may be replaced by, for example, a potassium hydroxide aqueous solution for dissolution of the porous alumina layer.

For example, in the case of reworking the mold 100 which is manufactured using a metal pipe as the support 12 and which is used for transfer with a rotatable shaft being secured at the opposite ends of the support 12 as described above, the rotatable shaft is detached from the mold 100 before immersion in a NaOH aqueous solution for dissolution of the porous alumina layer 14. In this case, when the rotatable shaft is secured with a bolt, detachment of the rotatable shaft is easy as compared with a case where it is secured by welding, and accordingly, there is an advantage that reworking is also easy.

Another reworking method is realized by, for example, applying a curable resin to the surface of the porous alumina layer 14 to form a curable resin layer, curing the curable resin to form a new organic insulating layer, and thereafter, performing the step of forming an aluminum film and the anodization step.

Figure 3:
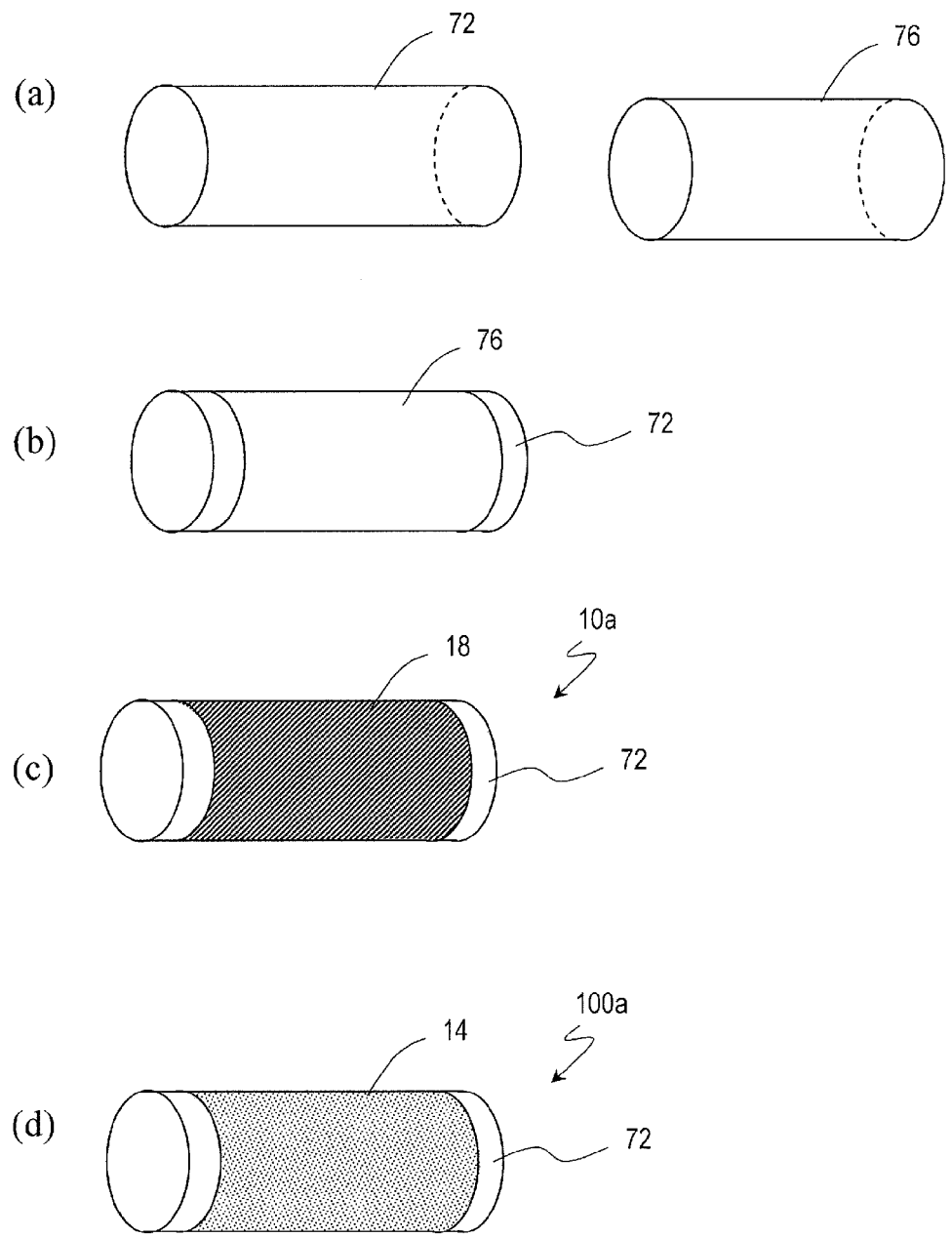
[FIG. 3] (a) to (d) are diagrams for illustrating a mold manufacturing method of an embodiment of the present invention.

The mold 100a of an embodiment of the present invention (FIG. 3(d)) is manufactured using the tubular resin film 76 and is therefore easily reworkable. For example, the tubular resin film 76 that is adhered on the outer perimeter surface of the support 72 is cut such that the incision extends parallel to the axial direction and is peeled off from the support 72, and thereafter, the step of adhering a new tubular resin film to the outer perimeter surface of the support 72, the step of forming an aluminum film, and the anodization step are performed according to the same method as that previously described with reference to FIG. 3, whereby reworking can be realized.

Another reworking method is realized by, as described above, for example, applying a curable resin to the surface of the porous alumina layer 14 to form a curable resin layer, curing the curable resin to form a new tubular resin film, and thereafter, performing the step of forming an aluminum film and the anodization step. For example, in the mold 100a that is manufactured using the support 72, when the adhesive property and the adhesion of the tubular resin film 76 to the support 72 are high, reworking may be realized, without peeling off the tubular resin film 76, by applying a curable resin to the surface of the porous alumina layer 14 to form a curable resin layer, curing the curable resin layer to form a new tubular resin film, and thereafter performing the step of forming an aluminum film and the anodization step as described above.

For example, in the case of a mold in the form of a roll which is manufactured by directly anodizing a surface of a cylindrical aluminum pipe or a solid cylindrical aluminum pole, the mold that is in the form of a roll need to be entirely renewed when the porous alumina layer is worn out. Whichever of the above-described methods is employed, it is not necessary to renew the hollow cylindrical support 12 or the support 72 that is in the form of a roll, and therefore, reworking is realized at a low cost.

In the case of the mold 100b and the mold 100c that are manufactured using the metal sleeve 72m as the support 72, reworking is easy as compared with a mold which is manufactured using a solid cylindrical support as the support 72. The molds which are manufactured using the metal sleeve 72m (the mold 100b (FIG. 4(f)) and the mold 100c (FIG. 6(e)) have a lighter weight than a mold in which a solid cylindrical support is used as the support 72, and therefore, those molds provide better handleability. Thus, in the above-described reworking methods, the step of peeling off a film and the step of forming the curable resin layer can be performed relatively easily. When the adhesion and the adhesive property between the tubular resin film 76 and the metal sleeve 72m are high, the entire mold, including the metal sleeve 72m, may be renewed. This incurs a low cost as compared with renewal of the entire mold in the case where the mold as manufactured is used in production of an antireflection film, such as a mold in the form of a roll which is manufactured using a solid cylindrical support. In the case of a mold which is manufactured using a metal sleeve as the hollow cylindrical support 12, the reworking process is also relatively easy.

Also, the mold 100a, which is manufactured using an aluminum or stainless steel pipe as the support 72 in the form of a roll, and the mold 100, which is manufactured using an aluminum or stainless steel pipe as the hollow cylindrical support 12, have a lighter weight than a mold which is manufactured using a solid cylindrical support, and therefore have an advantage that the reworking process is relatively easy.

A mold manufacturing method of an embodiment of the present invention can also be employed in manufacture of a non-motheye mold. For example, it can be employed in manufacture of a mold which is used for production of a photonic crystal.

INDUSTRIAL APPLICABILITY

A mold of the present invention can be used as a mold for production of an antireflection film, a photonic crystal, etc.

REFERENCE SIGNS LIST 10, 10a mold base
12 hollow cylindrical support
14 porous alumina layer
14p micropore
16 insulating layer
18 aluminum film
18s surface of aluminum film
72 support that is in the form of a roll
72m metal sleeve
76 tubular resin film
100, 100a mold
100A moth-eye mold

The invention claimed is:
1. A method for manufacturing a mold which has a porous alumina layer over its surface, comprising the steps of:
 (a) providing a hollow cylindrical support;
 (b) forming an insulating layer on an outer perimeter surface of the hollow cylindrical support;
 (c) depositing aluminum on the insulating layer to form an aluminum film; and
 (d) anodizing a surface of the aluminum film to form a porous alumina layer which has a plurality of minute recessed portions.
2. The method of claim 1, wherein the insulating layer is an organic insulating layer.
3. The method of claim 2, wherein step (b) includes
 (e) applying a curable resin to the outer perimeter surface of the hollow cylindrical support to form a curable resin layer, and
 (f) curing the curable resin.
4. The method of claim 3, wherein step (e) includes forming the curable resin layer by means of electrodeposition.
5. The method of claim 3, wherein step (e) includes forming the curable resin layer by means of spray painting.
6. The method of claim 3, wherein the curable resin contains acrylic melamine.

7. The method of claim 3, wherein the curable resin contains urethane.

8. The method of claim 3, wherein the curable resin contains a polyamic acid.

9. The method of claim 1, wherein the hollow cylindrical support is a cylindrical metal pipe.

10. The method of claim 1, wherein the hollow cylindrical support is a flexible metal sleeve.

11. A method for manufacturing a mold which has a porous alumina layer over its surface, comprising the steps of:
   (a) providing a support that is in the form of a roll and a tubular resin film;
   (b) adhering the tubular resin film to an outer perimeter surface of the support that is in the form of a roll;
   (c) depositing aluminum on the tubular resin film to form an aluminum film; and
   (d) anodizing a surface of the aluminum film to form a porous alumina layer which has a plurality of minute recessed portions.

12. The method of claim 11, wherein the tubular resin film is a polyimide film.

13. The method of claim 12, wherein in steps (a) and (b) the polyimide film has an imidization rate of not more than 99%.

14. The method of claim 11, wherein
   the support that is in the form of a roll is a flexible metal sleeve, and
   step (b) includes
      bending the metal sleeve,
      inserting the metal sleeve into the tubular resin film in such a manner that the metal sleeve is maintained in a bent state during the insertion, and
      causing the metal sleeve to recover from the bent state such that the tubular resin film adheres to an outer perimeter surface of the metal sleeve.

15. The method of claim 1, wherein
   the porous alumina layer has a plurality of minute recessed portions whose two-dimensional size viewed in a direction normal to its surface is not less than 50 nm and less than 500 nm,
   the method further comprises the steps of
      (g) bringing the porous alumina layer into contact with an etching solution to enlarge the plurality of minute recessed portions of the porous alumina layer, and
      (h) after step (g), further anodizing the surface of the aluminum film to grow the plurality of minute recessed portions, and
   after step (h), step (g) and step (h) are further performed.

16. A method for producing an antireflection film, comprising the steps of:
   i) providing a mold has a porous alumina layer over its surface, manufacturing by the method comprising the steps of:
      (a) providing a hollow cylindrical support;
      (b) forming an insulating layer on an outer perimeter surface of the hollow cylindrical support;
      (c) depositing aluminum on the insulating layer to form an aluminum film; and
      (d) anodizing a surface of the aluminum film to form a porous alumina layer which has a plurality of minute recessed portions;
      wherein the mold comprising a porous alumina layer which has an inverted moth-eye structure over its surface, the porous alumina layer having a plurality of minute recessed portions whose two-dimensional size viewed in a direction normal to its surface is not less than 50 nm and less than 500 nm and
   ii) providing a work; and
   iii) irradiating a UV-curable resin provided between the mold and a surface of the work with ultraviolet light, thereby curing the UV-curable resin.

17. A method for producing an antireflection film, comprising the steps of:
   providing the mold manufactured according to the manufacturing method as set forth in claim 10, the mold comprising a porous alumina layer which has an inverted moth-eye structure over its surface, the porous alumina layer having a plurality of minute recessed portions whose two-dimensional size viewed in a direction normal to its surface is not less than 50 nm and less than 500 nm, a core member that is in the form of a roll, and a work;
   inserting the core member that is in the form of a roll inside the flexible metal sleeve; and
   irradiating a UV-curable resin provided between the mold and a surface of the work with ultraviolet light, thereby curing the UV-curable resin.

18. A method for producing an antireflection film, comprising the steps of:
   providing the mold manufactured according to the manufacturing method as set forth in claim 14, the mold comprising a porous alumina layer which has an inverted moth-eye structure over its surface, the porous alumina layer having a plurality of minute recessed portions whose two-dimensional size viewed in a direction normal to its surface is not less than 50 nm and less than 500 nm, a core member that is in the form of a roll, and a work;
   inserting the core member that is in the form of a roll inside the metal sleeve; and
   irradiating a UV-curable resin provided between the mold and a surface of the work with ultraviolet light, thereby curing the UV-curable resin.

* * * * *